United States Patent
Grider et al.

(10) Patent No.: US 11,048,699 B1
(45) Date of Patent: Jun. 29, 2021

(54) GRAND UNIFIED FILE INDEXING

(71) Applicant: Triad National Security, LLC, Los Alamos, NM (US)

(72) Inventors: Gary A. Grider, Los Alamos, NM (US); Dominic Anthony Manno, Albuquerque, NM (US); Wendy Kinton Poole, Los Alamos, NM (US); David Bonnie, Los Alamos, NM (US); Jeffrey Thornton Inman, Santa Fe, NM (US)

(73) Assignee: Triad National Security, LLC, Los Alamos, NM (US)

( * ) Notice: Subject to any disclaimer, the term of this patent is extended or adjusted under 35 U.S.C. 154(b) by 188 days.

(21) Appl. No.: 16/353,882

(22) Filed: Mar. 14, 2019

Related U.S. Application Data

(60) Provisional application No. 62/645,680, filed on Mar. 20, 2018.

(51) Int. Cl.
*G06F 16/2453* (2019.01)
*G06F 16/22* (2019.01)
*G06F 16/901* (2019.01)
*G06F 16/908* (2019.01)

(52) U.S. Cl.
CPC .... *G06F 16/24532* (2019.01); *G06F 16/2246* (2019.01); *G06F 16/2272* (2019.01); *G06F 16/902* (2019.01); *G06F 16/908* (2019.01)

(58) Field of Classification Search
None
See application file for complete search history.

(56) References Cited

U.S. PATENT DOCUMENTS

| | | |
|---|---|---|
| 8,417,746 B1 * | 4/2013 | Gillett, Jr. ............... G06F 16/14 707/829 |
| 8,825,652 B1 | 9/2014 | Faibish et al. |
| 8,868,576 B1 | 10/2014 | Faibish et al. |
| 8,949,255 B1 | 2/2015 | Faibish et al. |
| 9,087,075 B1 | 7/2015 | Faibish et al. |
| 9,122,700 B2 | 9/2015 | Grider et al. |

(Continued)

OTHER PUBLICATIONS

Inode and its structure in linux, https://www.slashroot.in/inode-and-its-structure-linux; 2012 (Year: 2012).*

(Continued)

*Primary Examiner* — Hau H Hoang
(74) *Attorney, Agent, or Firm* — Klarquist Sparkman, LLP

(57) ABSTRACT

Systems and methods are disclosed for a unified file index for a file system. In one example, a Grand Unified File Index (GUFI) includes a tree replicating the directory hierarchy of one or more primary filesystems, and individual metadata stores for each directory. The GUFI tree permits fast traversal, efficient user space access controls, and simple tree directed operations such as renames, moves, or permission changes. In some examples, the individual metadata stores can be implemented as embedded databases on flash storage for speed. In some examples, use of summary tables at the directory or subtree level can eliminate wasteful executions, prune tree traversal, and further improve performance. In various examples, efficient operation can be achieved from laptop to supercomputer scale, across a wide mix of file distributions and filesystems.

20 Claims, 7 Drawing Sheets

(56) References Cited

U.S. PATENT DOCUMENTS

| | | |
|---|---|---|
| 9,158,540 B1 | 10/2015 | Tzelnic et al. |
| 9,245,048 B1 | 1/2016 | Bent et al. |
| 9,286,261 B1 | 3/2016 | Tzelnic et al. |
| 9,563,426 B1 | 2/2017 | Bent et al. |
| 9,767,107 B1 | 9/2017 | Bent et al. |
| 9,811,545 B1 | 11/2017 | Bent et al. |
| 9,852,146 B1 | 12/2017 | Bent et al. |
| 9,870,168 B1 | 1/2018 | Bent et al. |
| 10,135,924 B2 | 11/2018 | Bent et al. |
| 10,140,304 B1 | 11/2018 | Bent et al. |
| 2011/0196899 A1* | 8/2011 | Hughes .................. G06F 16/13 707/809 |
| 2016/0371296 A1* | 12/2016 | Passey ................ G06F 16/1734 |

OTHER PUBLICATIONS

Clark, "Los Alamos National Laboratory Releases File Index Product to Software Community," *Los Alamos Daily Post*, downloaded from https://ladailypost.com/content/los-alamos-national-laboratory-releases-file-index-product-software-community, 9 pages (Mar. 22, 2018).

"GitHub—mar-file-system/GUFI: Grand Unified File-Index," downloaded from https://github.com/mar-file-system/GUFI, 2 pages (Mar. 8, 2019).

"Grand Unified File Index (GUFI)," 75 pages (Feb. 2019).

Grider, "Grand Unified File Index Overview," *Presentation, Los Alamos National Laboratory*, LA-UR-21535, 27 pages, document dated Feb. 2018.

"Starfish Storage," 5 pages, apparent date Jun. 2015.

"Storage Data Analysis with Nirvana SRB," *Presentation for 2014 IEEE MSST Conference*, Santa Clara, CA, 13 pages (Jun. 2014).

\* cited by examiner

GRAND UNIFIED FILE INDEXING

CROSS-REFERENCE TO RELATED APPLICATIONS

This application claims the benefit of U.S. Provisional Application No. 62/645,680, entitled "GRAND UNIFIED FILE INDEXING," filed Mar. 20, 2018, which application is incorporated by reference herein in its entirety.

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

BACKGROUND

Volumes of data, numbers of files, logical sizes of storage systems, and numbers of applications are all increasing rapidly, while storage tiers and filesystems continue to evolve. Large computing sites often have a heterogeneous mix of parallel and non-parallel filesystems organized in tiers and distributed across many computing systems and across diverse storage systems. In many filesystems of interest, operations on the metadata side of storage operations have not been implemented in a scalable way. At times, metadata operations can significantly burden filesystems and congest data side operations.

Existing approaches to metadata management suffer from drawbacks as design tradeoffs lead to compromises. Some approaches offer efficient query processing, but suffer from inefficient operations such as high-level renames or moves. Some approaches offer efficient high-level operations, but suffer from inefficient traversal of a filesystem hierarchy. Other approaches work well for system administrators, but suffer from inefficient support of user permissions, leading to very slow query processing for queries in user space. Some approaches provide good overall performance, but are purpose-built for a specific application or a specific filesystem. Many approaches are susceptible to data side performance degradation caused by metadata operations, as efficient data side operations compete with relatively inefficient metadata queries for the same filesystem metadata resources.

Accordingly, there is ample opportunity for improved technology for indexing filesystems and supporting metadata queries.

SUMMARY

Apparatus and methods are disclosed for providing filesystems and filesystem indexes. In some examples of the disclosed technology, a Grand Unified File Index (GUFI) is implemented combining a tree that mirrors the directory hierarchy of a primary filesystem with an attribute farm that contains independent metadata stores for each directory of the primary filesystem. By mirroring a primary filesystem, metadata queries can be separated from data side operations. The tree architecture readily supports trees for many different primary filesystems under a single GUFI root node. The tree architecture also efficiently supports user access controls and high-level operations like renames. The independent data stores for each directory support massively parallel query processing. In some examples, the metadata stores can include directory-level or tree-level summary tables to further expedite query processing by pruning filesystem traversal at the directory or tree level. In some examples, the individual metadata stores can be implemented on flash storage for even faster query processing.

According to one aspect, the disclosed technologies can be implemented as a method of indexing metadata in a filesystem. A GUFI, as described herein, is built from at least one primary filesystem. The GUFI is updated with updated metadata from the primary filesystem(s).

In some examples, the GUFI includes a tree having multiple nodes and replicating a directory structure of one or more of the primary filesystem(s). Nodes of the tree represent respective directories of the primary filesystem(s). The GUFI can also include one or more database tables for at least one of the nodes, the database tables storing file attribute information. The database tables can include an entries table having a plurality of records for respective entries (e.g. files or links) in the corresponding directory, the records storing metadata attributes of the respective entries. The database tables can include a summary table storing summary attributes over respective files (or other entries) in the corresponding directory. The database tables can include a tree-summary table storing summary attributes aggregated over directories or files of a subtree headed by the corresponding directory.

In further examples, the building can include parallelized breadth-first traversal of the directories by respective threads or processes. Each thread or process can load metadata of entries of the corresponding directory into one or more database tables. These database tables can be linked to a GUFI node associated with the corresponding directory. In additional examples, the updating can include pushing the updated metadata to the GUFI in response to an event at a primary filesystem. The updating can include retrieving the updated metadata from a primary filesystem responsive to a schedule. The primary filesystems can include one or more of a flat filesystem or a POSIX-compliant filesystem.

In another aspect, the disclosed technologies can be implemented as a method or processing filesystem metadata queries. A query is received targeted to a filesystem directory. A first node is identified in a tree having multiple nodes with associated database tables, the first node corresponding to the filesystem directory. Nodes of a subtree of the first node are traversed, each traversed node corresponding to a subdirectory of the filesystem directory. A database table is queried at one or more of the traversed nodes to obtain results. A response to the received query is provided, based on at least a portion of the results collected over the traversed nodes.

In certain examples, the tree can be a GUFI tree. The traversal can be parallelized among multiple threads. The querying of the database table can be performed using an embedded database library, such as SQLite. In some examples, the received query can be associated with a first user, and the traversal can be restricted to nodes of the first node's subtree for which the user has a first permission such as an execute permission.

In some examples, the database tables of a given node can include an entries table and a directory summary table similar to those described herein, at least one of which can be queried in response to the received query. A query can be applied to the directory summary table at the given node to obtain a first result. Responsive to the first result, further query on database tables of the given node can be omitted. The given node can correspond to a particular subdirectory within the filesystem. The given node can be a root of a GUFI subtree, and the particular subdirectory can be a root of a filesystem subtree. The database tables of the given node can include a tree-summary table aggregating metadata attributes over the filesystem subtree. The query can be applied to the tree-summary table to obtain a result for the filesystem subtree. Responsive to this result, further query on the GUFI subtree can be omitted.

In additional examples, any of the disclosed methods can be implemented as computer-executable instructions stored on one or more computer-readable storage media. The disclosed technology can be implemented as a system including such storage media and one or more processors configured to execute the stored computer-executable instructions.

In further aspects, the disclosed technologies can be implemented as computer-readable storage media storing a GUFI; or as a system incorporating one or more processors with coupled memory, the computer-readable media storing the GUFI, and computer-readable media storing computer-readable instructions which, when executed by the processors, cause actions to be performed as described herein. The GUFI can include a tree having multiple nodes representing respective directories of a primary filesystem. Nodes of the tree represent respective directories of the primary filesystem(s). The GUFI can also include one or more database tables for at least one of the nodes, the database tables storing file attribute information. The instructions include first instructions that cause the system to load the GUFI from the primary filesystem, second instructions that cause the system to update the GUFI from the primary filesystem, and third instructions that cause the system to process filesystem metadata queries using the GUFI. In some examples, the system can include a flash storage device on which the database table is stored. In further examples, two or more nodes of the multiple nodes can have distinct database tables.

The innovations can be implemented as part of one or more methods, as part of one or more computing systems adapted to perform an innovative method, or as part of computer-readable media storing computer-executable instructions that cause a computing system to perform the innovative method(s). The various innovations can be used in combination or separately. The foregoing and other objects, features, and advantages of the disclosed technology will become more apparent from the following detailed description, which proceeds with reference to the accompanying figures. As described herein, a variety of other features and advantages can be incorporated into the technologies as desired.

DETAILED DESCRIPTION

Figure 1:
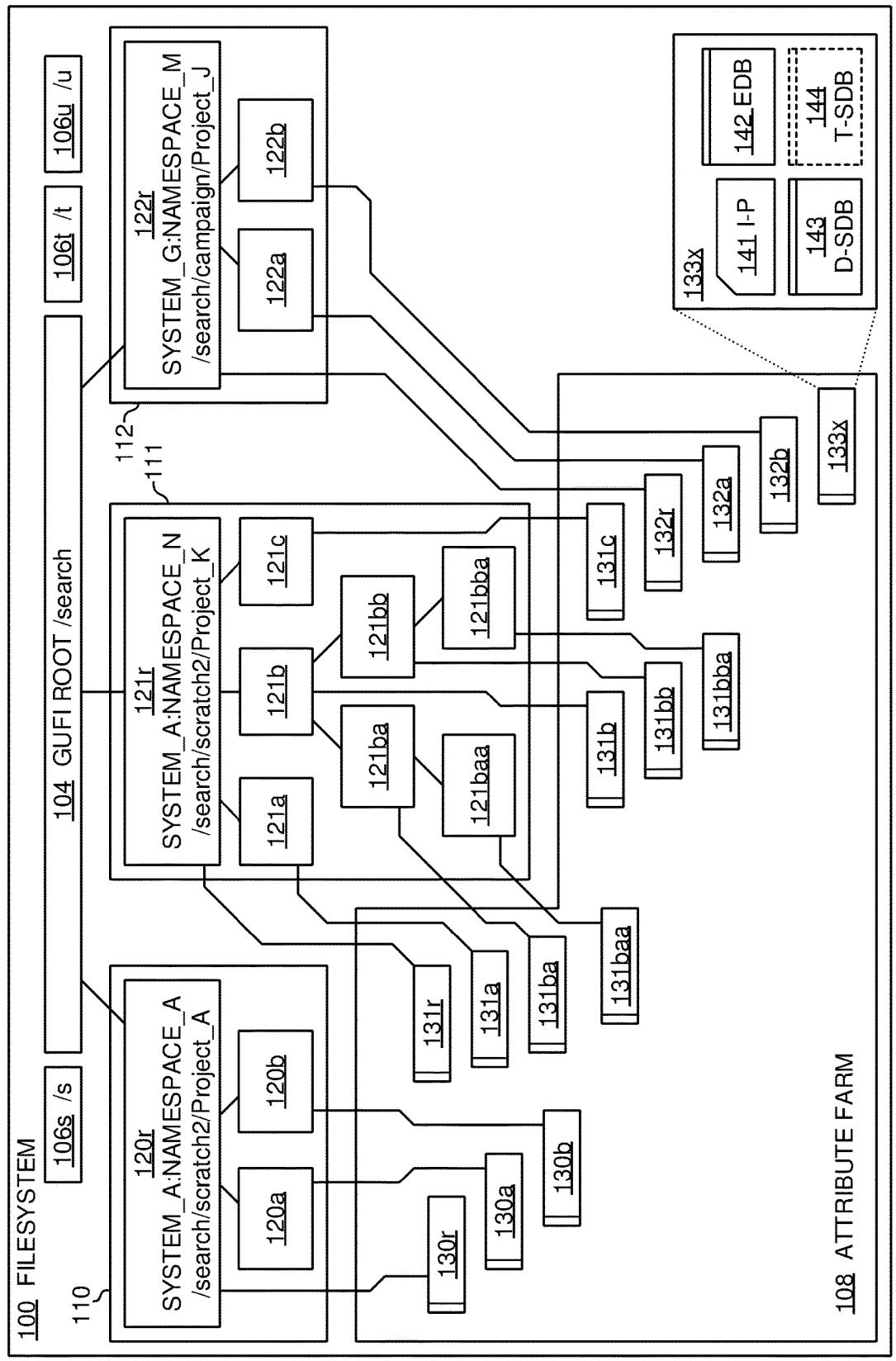
FIG. 1 is a block diagram of an example filesystem demonstrating some features of the disclosed technologies.

This disclosure is set forth in the context of representative embodiments that are not intended to be limiting in any way.

I. Introduction

Large-Scale Computing Environments

Many computing sites commonly have multiple coexisting filesystems, often including multiple types of POSIX-oriented (POSIX: Portable Operating System Interface) and other filesystems. At high performance computing (HPC) sites, large parallel scratch file systems can be used for supercomputer operations such as checkpoint restart, input, or analysis. Multiple parallel scratch file systems can be deployed for availability or other purposes. Technologies like IBM's GPFS (General Parallel File System), Lustre, PVFS (Parallel Virtual File System), and Panasas can be used. There can also be non-parallel filesystems to hold home and project directories, which can be provided by NFS (Network File System) or other solutions. Additionally, HPC sites can have cool or cold storage filesystems like campaign stores or archives. While cool or cold storage may not be visible as a POSIX mounted file system, the file metadata for these systems can be represented using POSIX tree-based name and attribute spaces for access and queries as needed. Accordingly, a large computing site could have hundreds of billions to many trillion of files in POSIX like tree name and attribute structures. In such an environment, both users and administrators need tools to find files or sets of files by querying file attributes such as path, name, size, timestamp, and extended attributes of many kinds and across multiple diverse filesystems.

Conventionally available filesystem technologies used to provide services at different tiers (like scratch, home or project, cool, and cold storage) can be optimized for their particular jobs but none are really optimized for metadata search and none are well suited for universal or near-universal deployment across filesystem types, filesystems, and storage tiers.

In the computing environment described above, a number of goals can be identified for a file index for storing, organizing, or maintaining filesystem metadata. Query processing should support metadata search across trillions of files in minutes. Metadata search should operate uniformly and transparently across multiple heterogeneous filesystems with different implementations for metadata. Search should cover all metadata attributes and extended attributes but need not extend to file contents. The file index should work well for both administrative clients and user clients. The file index should honor POSIX security mechanisms including inherited tree-based permissions (i.e. lack of execute permission on a directory also blocks access to all subdirectories of that directory). The file index should efficiently support difficult POSIX namespace or attribute operations such as directory renames from any level in a filesystem hierarchy, or unlink operations.

The file index should support massively parallel operations. Alongside parallel threading, it can be desirable for metadata search operations to be well-matched to few kB access sizes for efficient implementation on flash storage drives.

The file index should support full or incremental updates from primary filesystems, and customizable parallel search capabilities. The file index should appear as a mounted file system whereby a virtual image of filesystem metadata can be obtained by a query input. The file index should provide loading or updating speeds on the order of, or at least, hundreds of thousands of directory entries (e.g. files) per second. The file index architecture and support software should be simple for a storage administrator to understand, and the required software should be compact. The file index should be easily extensible. The file index should scale well from a common laptop computer to a multi-node cluster or a supercomputer.

The file index should utilize mature best-of-breed technologies to the extent feasible. Some of these technologies include flash storage, UNIX tree traversal with user space access controls, snapshots, relational database technology, SQL-like query interfaces, and high parallelism at the thread, process, or node level.

Example GUFI Hybrid Approach

In some examples of the disclosed technology, a Grand Unified File Index (GUFI) utilizes a hybrid approach, combining UNIX style trees for directories and relational database technology for directory entries, with an SQL-like query interface. The trees leverage mature and efficient POSIX tree-walking, directory traversal using e.g. readdir, readdirplus, and related calls, aggressive caching, and permissions checking. POSIX security can be provided inherently.

The databases can provide efficient flat repositories for metadata attributes and extended attributes. An architecture with separate databases for each directory provides several advantages. Massive parallelism based on breadth-first traversal can be inherent for query processing, and also for loading or maintaining metadata in the GUFI. Because it can be commonplace for directories to have on the order of 10-100 entries, the volume of metadata can be well matched to flash storage, and embeddable databases such as an SQLite version can provide very fast performance. As used herein, the term "SQLite" can refer to any version thereof. Yet this architecture continues to work efficiently over a much wider range of directory sizes, from as few as 1 to as many as $10^6$, $10^8$, or even $10^9$ entries in a single directory.

The tree architecture also lends itself to decomposition, whereby subtrees can be separated and managed on different compute nodes, for explicit cross-node parallelism and scalability.

Aspects of GUFI Systems and Methodologies

SPEED: Certain implementations of disclosed GUFI architectures combine a number of features that overall lead to parallelism, scalability, and speed, even for the largest scales currently known or conceived. In some examples, a GUFI tree supports fast, optimized traversal. The GUFI tree can also readily be partitioned across nodes for explicit parallelism. Breadth-first traversal with independent databases for each tree node (directory) enable massive parallelism. This contrasts with flat architectures in which all directories share a common database for metadata entries, which does not scale. Some flat architectures require repetitive queries to determine a full path, which can be very inefficient for traversal. Embedded databases implemented in flash storage further contribute to speed. The use of summary tables, as described herein, eliminates wasteful executions and also contributes to speed.

USER SECURITY: POSIX style security can be inherent in the GUFI tree architecture, which can support hierarchical access control. Thus, a user space client can be blocked from accessing a tree at a single point, and can efficiently traverse its accessible portion of the file index. This contrasts with fully flat architectures in which access checks can be made separately for each directory entry. Access control at the object or entry level can be tolerable on the data side of storage operations, where commonly one or a few files can be accessed at a time, but can be intolerable for metadata searches where directory entries can be searched en masse.

HIGH-LEVEL OPERATIONS: Renames, moves, and permission changes high in a filesystem hierarchy can be efficiently supported through the GUFI tree architecture, whereby such operations can be performed as a single action. This contrasts with fully flat architectures in which a single operation can be replicated thousands, millions, or even billions of times to propagate to every affected directory entry.

CONGESTION: Some GUFI embodiments replicate the directory hierarchy of a primary filesystem in the GUFI tree. As described herein, loading a GUFI from a primary filesystem can be a lightweight operation on the primary filesystem, and subsequent metadata searches can be performed on the GUFI, with no burden on the primary filesystem at all.

POSIX COMPLIANCE: Some GUFI embodiments can be implemented as a hierarchical POSIX-like tree or filesystem, allowing the GUFI to be readily manipulated using filesystem utilities such as cp, mv, mount, or tar.

Interaction between GUFI and Primary Filesystems

Initially, a GUFI can be loaded from a primary filesystem. Subsequently, the GUFI can be updated to reflect changes in the primary filesystem. These changes can reflect growth, addition, deletion, or renaming of files, and accordingly updates to the GUFI can include changes to one or more entries, or addition or removal of entries. Updating can be performed according to a schedule, e.g. once every minute for active or volatile filesystems or once every hour for cool storage tiers. Updating can be triggered by specific events, such as tree renames or directory creation, or can be performed responsive by explicit from an administrative client or even a user client. The tree organization of the GUFI permits many such updates to be performed very easily at a single point or by a single action, without propagation of changes to large numbers of individual directory entries. Snapshots of the primary filesystem can be used for an initial GUFI build or for updates.

The GUFI tree need not be a replica of the primary filesystem directory hierarchy. In some embodiments, the GUFI tree can be the primary filesystem hierarchy, and considerable benefit can still be realized by implementing individual databases for each filesystem directory, with parallelizable scalable metadata searches using GUFI software. This approach avoids replication of any updates to the GUFI, and can be suitable for cool storage where contention between metadata operations and data side operations can be less of a concern.

II. Terminology

As used herein, a "GUFI" is a Grand Unified File Index, and contains at least a tree representing the hierarchy of directories of a primary filesystem, and databases for respective directories storing metadata of the directory entries. A minimal GUFI contains nodes for least first and second non-empty directories of the primary filesystem, wherein the second directory is a subdirectory of the first directory and the first and second directories have distinct databases for their respective entries. GUFI embodiments can have many additional optional properties as described herein.

As used herein, a "primary filesystem" is a directory structure of organized objects such as files, and through which information about the objects (i.e. metadata) can be obtained, and through which the objects can be located and accessed e.g. for reading or writing. A GUFI can provide the metadata information for objects of a primary filesystem, and can optionally provide location of or access to the objects themselves.

As used herein, a "directory" contains entries for objects, which can be other directories (subdirectories), files, or links. The entries in a directory contain metadata information of the respective objects, such as name, type, size, various timestamps, owner, and so forth. In a GUFI, directories can be organized in a tree, and entries can be stored in database tables.

As used herein, the terms "attributes" and "metadata" are used synonymously to refer to any properties or statistical measures of a directory entry excluding the actual data content of a corresponding object. Besides referring to properties of individual objects or directory entries, these terms can also be used to refer to properties or statistical measures of aggregates of objects, such as in directory summary tables and tree summary tables described herein. Statistical measures can include histograms, minimum values, maximum values, or sums of any other property—for example a histogram of file types, or a maximum size value—or simply counts of objects.

As used herein, the term "loading" refers to population or replication of all or part of a primary filesystem's metadata into a GUFI, and can include growing the GUFI tree from a root node, creating and populating (i.e. storing values into) entries databases EDB for respective nodes of the GUFI tree. Loading can additionally include creating, determining field values, and storing directory or tree summary databases (D-SDB, T-SDB) as described herein. Growing the GUFI tree can include creating and storing I-P files containing the inode-to-parent relationships of each node of the GUFI tree. Occasionally, and where clear from the context, words similar to "load" can be used in other contexts, for example a metadata search can impose a load or burden on a filesystem.

As used herein, the terms "directory" and "subdirectory" are generally used synonymously. Most directories can be subdirectories of some other respective parent directories. Any directory or subdirectory can have, but need not have, subdirectories of its own. The terms "tree" and "subtree" are also generally used synonymously. Most trees can be subtrees of some other parent trees. Any tree or subtree can have, but need not have, subtrees of its own. The root node of a subtree is part of the subtree and is generally distinct from the root node of any parent.

As used herein, a "breadth-first" traversal of a tree can be parallelized. A task or thread operating on a given parent node at a given level of a tree can traverse the children nodes at the next level. However, where a single-threaded breadth-first traversal could continue on to traverse grandchildren nodes after the child nodes have been traversed, in a parallelized traversal separate threads can be launched on the child nodes. Each child node thread can be responsible for traversing the respective grandchildren, independently of other threads. Depending on the availability of processor resources, a child node thread can commence operation before the parent node thread has finished. The single-threaded and parallelized breadth-first traversal are similar in that traversal of second, third, etc. child nodes can proceed without waiting for traversal of any grandchildren nodes (e.g. children of the first child node). However, in keeping with the concept of parallelization, the temporal sequence in which nodes are traversed by parallel tasks or threads can differ from the ordering in a single-threaded breadth-first traversal.

III. Example Filesystem

FIG. 1 is a block diagram of an example filesystem 100 demonstrating some features of the disclosed technologies, such as a grand unified file index (GUFI) supporting a plurality of primary filesystems. The GUFI comprises a hierarchical directory tree, each node of which corresponds to a directory of a primary filesystem, and a farm of database tables for respective nodes or directories.

In this example, three primary filesystems are indicated as 106s, 106t, 106u mounted as /s, /t, and/u respectively. These filesystems can correspond to standard directories such as /home, /lib, /opt, /tmp, /usr or to non-standard directories such as /my_project. These filesystems can correspond to any combination of various tiers or longevity classes (e.g. scratch, campaign, cool, archive), any combination of various types of filesystems (e.g. POSIX, flat, or database filesystems), or any combination of computing systems. Primary filesystems can be mounted anywhere, e.g. /a/b/c/Primary_1, and need not be mounted at the top level of filesystem 100. Filesystem 100 can include additional primary filesystems not shown. As shown in FIG. 1, lines between directories and files in the hierarchy can be traversed bi-directionally.

In addition to primary filesystems 106s, 106t, 106u, filesystem 100 can include a grand unified file index having a tree rooted at GUFI root node 104 and mounted as/search. Under GUFI root node 104 can be found subtrees 110, 111, 112 for respective primary filesystems. In this illustration, subtree 110 has a root node 120r and corresponds to namespace Namespace_A of computing system System_A, which is a scratch filesystem mounted at /scratch2/Project_A. GUFI subtree 110 can mirror the hierarchical organization of the primary filesystem /scratch2/Project_A and can be mounted at /search/scratch2/Project_A. For simplicity of illustration, root node 120r is shown having just two subdirectories 120a, 120b. Each of the directories 120r, 120a, 120b can be linked to a respective attribute store 130r, 130a, 130b in which file and directory attributes (metadata) can be maintained. While in some examples, GUFI root node 104 can be mounted at the top level of filesystem 100, this is not a requirement: the GUFI root node could be mounted, for example, as /d/e/foo.

To respond to a metadata query on a primary filesystem such as /scratch2/Project_A, its GUFI mirror subtree 110 can be traversed, and corresponding metadata can be searched or gathered from associated metadata stores (dubbed "data stores" or "attribute stores") 130r, 130a, 130b. Mirroring any primary filesystem in a GUFI allows metadata operations to avoid congesting the primary filesystem's resources, and also provides a uniform efficient hybrid structure even where the primary filesystem is organized differently. The GUFI tree provides traversal, access control, and high-level operations (such as rename) that can be efficient, simple, and robust. The individual data stores provide fast, scalable access to metadata attributes. As a GUFI tree is traversed breadth-first, this organization naturally lends itself to massively parallel implementation for as many as billions or trillions of files, spread across up to millions or billions of directories, in as many as thousands or millions of primary filesystems.

In like manner, subtree 111 has a root node 121r and corresponds to namespace Namespace_N of computing system System_A, which is a scratch filesystem mounted at /scratch2/Project_K. Root node 121r has three levels of subdirectories: 121a, 121b, 121c at the first level; 121ba, 121bb (subdirectories of 121b) at the second level; and 121baa, 121bba (subdirectories of 121ba, 121bb respectively) at the third level. The root node and its subdirectory nodes are respectively associated with attribute stores 131r, 131a-131c, 131ba-131bb, 131baa-131bba.

Finally, subtree 112 has a root node 122r and corresponds to namespace Namespace_M of computing system System_G, which is a campaign filesystem mounted at /campaign/Project_J. Root node 122r has two subdirectories 122a, 122b; the three folders in subtree 112 are linked to attribute stores 132r, 132a, 132b as shown. Although the trees 110, 111, 112 are shown having different namespaces and different projects, this is not a requirement. A single project can be distributed over multiple computing systems, namespaces, or primary filesystems. Conversely, multiple projects can share a single computing system, namespace, or primary filesystem.

The nodes and directories of subtrees 110, 111, 112 are merely exemplary. The GUFI of filesystem 100 can contain many more primary filesystems, many more subtrees of GUFI root 104, and correspondingly many more attribute stores. In the illustration, the various attribute stores 130, 131, 132, 133 are shown within an attribute farm 108, however this is not a requirement. Multiple distinct attribute farms can be deployed, for example, one for each primary filesystem, or one for each of multiple computing systems on which the GUFI is hosted. In some examples, the attribute stores 130-133 can be stored on flash storage (e.g. solid state drives using flash memory) in a flash storage farm, while in other examples, an attribute store can be stored alongside its respective subtree or with a metadata server of the corresponding primary filesystem. At present, flash storage can support 1-2 million IOPs (input-output operations per second). In some examples, attribute farms can be deployed in memory, such as DRAM, or in other forms of persistent, non-persistent, or battery-backed up storage or memory devices.

An inset at the bottom right of FIG. 1 shows an exemplary constitution of one attribute store 133x, comprising an I-P file 141, an entries database EDB 142, a directory summary database D-SDB 143, and an optional tree summary database T-SDB 144. (For the purpose of discussion, attribute store 133x can be presumed to be associated with a directory 123, not shown.) I-P file 141 is a file providing an association between (i) the inode value of the directory 123 to which attribute store 133x belongs, and (ii) the inode value of the directory's parent, sometimes dubbed "parent inode" value. While I-P file 141 can be embedded in attribute store 133x as in this example, this is not a requirement. In other examples, I-P file 141 can be embedded in a subtree such as 111, alongside or within its associated directory, or maintained in separate tables. I-P file 141 can be created as part of GUFI loading as the GUFI tree is created, and can be modified subsequently, such as when move operations are performed.

Entries database EDB 142 can be the primary repository of metadata for filesystem objects such as files, directories, or links. Entries database 142 can include one or more relational database tables, such as an embedded SQLite database table. For each inode or directory value, a wealth of metadata information can be stored, such as file type, size, name, creation date, modification date, expiration date, access control information, owner, and so forth.

Summary databases 143, 144 can contain attribute summaries, which can include counts, histograms, or statistical parameters, over one or more directories. Particularly, directory summary database D-SDB 143 can contain attribute summaries over all entries of directory 123 (the directory associated with attribute store 133x). Tree summary database T-SDB 144 can contain attribute summaries aggregated recursively over the subtree of directory 123 and all of its subdirectories. In some examples, all attribute stores have an EDB similar to 142 and a D-SDB similar to 143. In some examples, all attribute stores (except possibly those corresponding to leaf nodes of a GUFI subtree) have a T-SDB similar to 144, while in other examples the tree summary databases can be selectively deployed at zero, one, or more of the nodes of a subtree. As an illustration, for subtree 111, only attribute store 131r and 131bb could have T-SDBs, while the other directories of subtree 111 could merely contain an I-P files, an EDB, and a D-SDB.

In some examples, a D-SDB 143 can be built concurrently with the corresponding EDB 142, while in other examples, the D-SDBs 143 can be built by a separate parallelizable task. In examples, T-SDB 144 can be built by collecting summary metadata from lower-level D-SDBs in a bottom-up traverse, after the D-SDBs have been built. Because building a T-SDB does not require examination of individual directory entries in the EDBs, it can be very fast. Updates of D-SDBs and T-SDBs can be performed with similar tree traversal and program flow as the original build of these summary tables.

In additional examples, views can be defined on one or more of these types of database tables. A "pentries" view can be defined to provide a parent inode value for an entries database such as EDB 142. This view can be analogous to the I-P table 141 described herein. In some examples, parent inode values are not stored due to save costs associated with certain moves, but rather parent inode values can be implemented as fields to be calculated or evaluated upon request. A "vsummaryuser" view can be defined to provide access to the portion of a summary table such as D-SDB 143 reflecting entries of the corresponding directory that are accessible to a user based on the user's permissions. Similarly, a "vsummarygroup" view can reflect summary information for entries in the corresponding directory that are accessible to a group based on the group's permissions. A "vsummarydir" view can be defined to reflect all entries of the corresponding directory, not filtered by user or group. Similar views can be defined for access to a tree summary database such as T-SDB 144. Views "vtreedir", "vtreeuser", and "vtreegroup", can provide access to summary or histogram information for: the entire tree, portions of a tree visible to a user, and visible to a group, respectively.

IV. Example Method for Processing a Metadata Query

Figure 2:
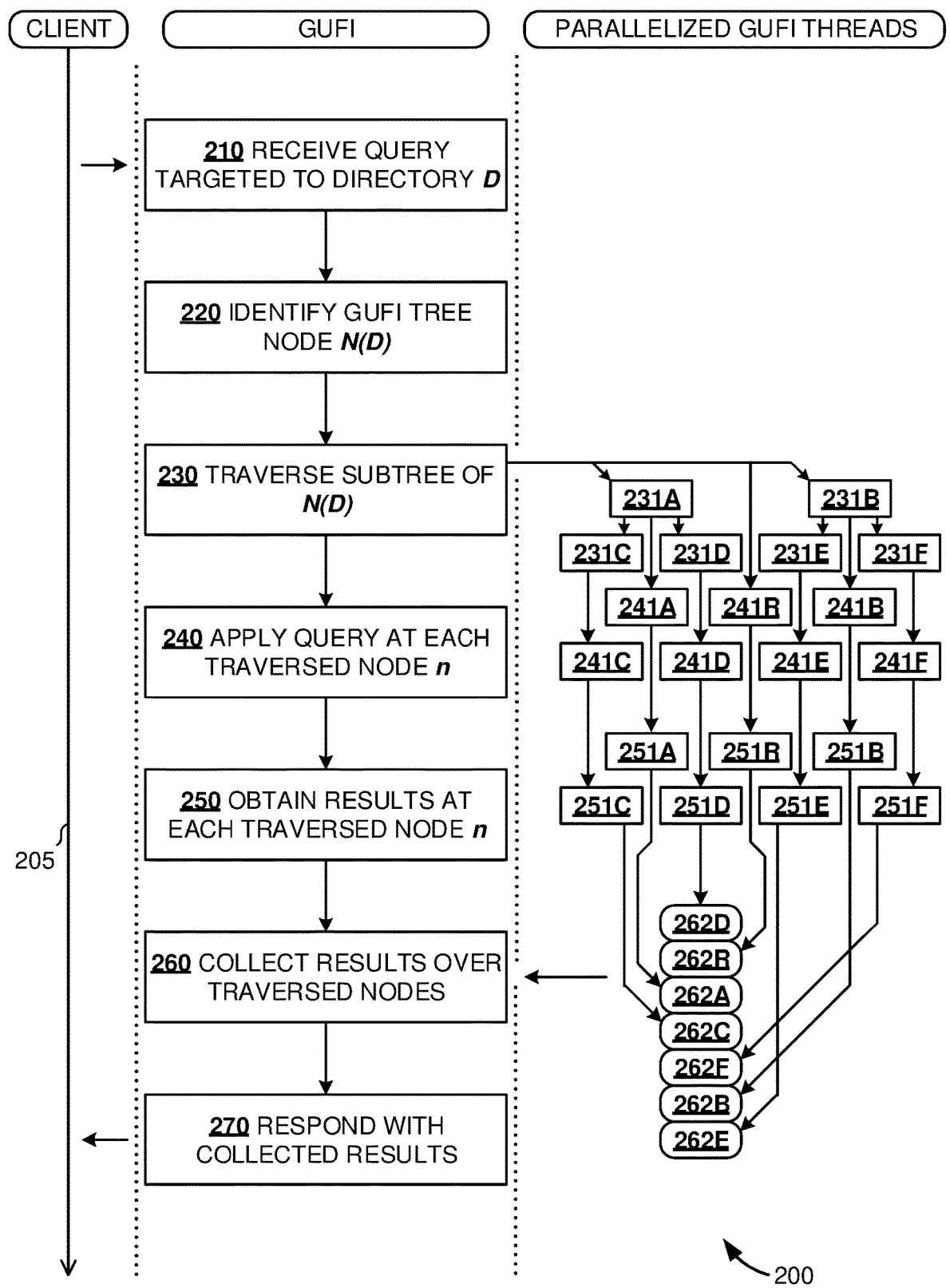
FIG. 2 is a flowchart outlining an example method for processing a metadata query according to disclosed technologies.

FIG. 2 is a flowchart 200 outlining an example method for processing a metadata query according to disclosed technologies. Flowchart 200 is organized in lanes. The middle lane labeled GUFI describes some principal aspects of the method. A left lane labeled Client is provided to illustrate interaction between a requesting client and the GUFI. A right lane labeled Parallelized GUFI Threads is provided to illustrate some aspects of parallelization that are possible with the method.

At process block 210, a GUFI interface can receive a query targeted to a filesystem directory D. The query can be received from a client such as an administrative console, a user application, or a housekeeping service. The query can be received as a call, as a message, or as a post retrieved from a queue. The filesystem directory D can be any directory within a primary filesystem mapped by the GUFI. For example, node 121b of FIG. 1 could correspond to a directory /scratch2/Project_K/Dir_B in a primary filesystem, and D could specify this directory.

At process block 220, the GUFI node can be identified for the target directory D. In the present illustration, the mapping from /scratch2/Project_K/Dir_B to /search/scratch2/Project_K/Dir B can be straightforward. However, in other examples, such as where the primary filesystem is not hierarchically organized, D can be resolved into a hierarchical path specification to determine the GUFI node N(D).

At process block 230, the subtree of GUFI node N(D) can be traversed. In some examples, the subtree traversal can be performed breadth-first to make use of inherent parallelism for distinct branches of the subtree, however this is not a requirement. In other examples, such as in case the subtree size is small or in case a maximum parallelism has already been reached, subtree traversal can be performed depth-first.

At process block 240, the query can be applied to each traversed node of N(D)'s subtree. In some examples, the received query can be applied in its original form, which can be an SQL style query, while in other examples, the received query can be transformed from a filesystem query format into a database query format. Conventional query commands such as is or find, with associated flags and filters, can be supported. In examples, the query can be expanded to take advantage of the summary databases D-SDB and optionally T-SDB for further efficiency in processing the query. In further examples, supported SQL or SQLite queries can be extended with specialized functions to support filesystem-specific variables, such as translation of UNIX numeric attributes to plain text.

The traversed nodes can be all nodes of N(D)'s subtree, or can be limited to a subset of all the subtree nodes. For example, if a query pertains to files older than one month, and a particular node N1 of N(D)'s subtree has a tree summary database T-SDB indicating that there are no such older files in N1's subtree, then traversal of N1's subtree can be omitted. The use of the summary databases to prune or gate query processing can be applied to any attribute supported by the summary databases, and can be easily extended by adding further summary records. To illustrate, if the summary databases D-SDB, T-SDB include histograms over file types, then queries searching for text files (e.g. "*.txt") can efficiently skip queries on directory EDBs or entire subtrees, as indicated by a count of zero text files in a D-SDB or T-SDB respectively. As another example, if a querying client lacks access permission on a particular node N2 of N(D)'s subtree, then traversal of N2's subtree can be omitted. Thus, the GUFI tree organization and the summary databases each provide significant efficiency enhancement according to the particulars of an embodiment and an instant query.

Responsive to the individual directory queries at process block 240, the query results for individual directories can be obtained at each traversed node at process block 250. At process block 260, these individual query results can be collected into consolidated results, which can be a text file, a database, in some other data structure, or simply as a bag of results from each individual directory or each individual parallel processing thread. In examples, the query results can be collected by concatenating or appending results sequentially as they arrive, which can involve appending to a consolidated results text file, adding rows to a consolidated results database, or otherwise growing a consolidated results data structure. In other examples, the individual directory results can be merged into the consolidated results in a predetermined sort order, such as a lexical sort order of the full path names of individual directories or directory entries in the corresponding primary filesystem. In further examples, the individual directory results can be joined together following a bottom-up tree traversal, i.e. in reverse of how the traversal is split into parallel tasks. The organization of the collected results can be specified in the query received at process block 210.

Finally, at process block 270, the collected results can be returned or made available to the requesting client. In varying examples, the collected results can be transmitted as a file over a network; can be posted as a file, database, bag, or other data structure to a client-accessible storage or memory location; can be provided to the requesting client as a link over a messaging interface; or can be made available on a server to be accessed over a web browser interface.

Turning to the right-hand lane of FIG. 2, some illustrative aspects of parallelized operation are shown. Process block 230 described above provides for traversal of the subtree of GUFI tree node N(D). This traversal can be implemented as a breadth-first search. As illustrated in FIG. 2, N(D) can have two subdirectories for which separate traversal processes can be launched at process blocks 231A, 231B; these in turn can have two subdirectories for which separate traversal processes 231C, 231D, 231E, 231F are shown. Thus, up to seven separate processes or threads can be launched to cover N(D) and six subdirectories as described. Generally, each directory encountered can be placed on a queue to be dispatched to another process or thread. In addition to spawning new processes for subdirectories of its given node, any process block such as 231B can also process files, links, or other entries within the instant directory of the given node itself.

Such parallelism can be extended to further levels of N(D)'s subtree, until resource limits are reached. Resource limits can be set based on numbers of available processors, cores, or preset limits on allowed threads or processes on individual processing units. Varying embodiments can handle the absence of resources in different ways. In some examples, traversal of a given node can wait in a queue or stall until a resource is available, while in other examples, traversal below the given node can be serialized in either a breadth-first or depth-first manner.

Parallelization can be continued to process blocks 240, 250. Each of process blocks 241A-241F can apply queries to the respective nodes of process blocks 231A-231F, and each of process blocks 251A-251F can obtain the individual directory results corresponding to process blocks 231A-231F. Process blocks 241R, 251R correspondingly apply the query and obtain the results for entries in the targeted directory D (which is also the subtree root directory D).

At process block 260, the individual directory results 262A-262F, 262R can be collected by concatenation in the order received. As described herein, other techniques for collection or consolidation can be used.

With this disclosure in hand, one of ordinary skill will appreciate that many variations in implementation are possible. For example, whereas the right lane of FIG. 2 shows all parallel threads eventually leading to results, this is not a requirement. As described herein, some nodes and subtrees could be dead ends, either by lack of user permissions or based on summary information in a D-SDB or T-SDB summary database. As another example, the process blocks 230, 240, 250 (along with their parallelized counterparts) are shown occurring sequentially for simplicity of illustration. In examples, any one or more of these process blocks can be implemented using iteration, using stream processing, or using pipelined processing, so that portions of process blocks 240, 250 can begin before earlier process blocks 230, 240 have completed. Further, the description above is in context of a query over a filesystem subtree (e.g. "ls-R") which includes traversal over a plurality of nodes and directories and illustrates the parallelized operation of GUFI queries, however this is not a requirement. GUFI can also support queries directed to a single directory, in which case the subtree of N(D) has a single node to be traversed.

In some examples, a primary filesystem can incorporate hard links or soft links. A hard link is an alternate name or path to a data object. Inasmuch as GUFI is a metadata index, while the actual data object resides in the primary filesystem, the hard link is a metadata entry like any other metadata entry, and can be handled easily with no impact on tree traversal. A soft link is a path that points at another path (e.g. at another directory). To illustrate, a soft link that points to /e/f/g in some primary filesystem can be handled by incorporating the /e/f/g hierarchy under the GUFI root node, e.g. as /search/e/f/g and then following the soft link naturally during tree traversal at process block 230. The GUFI architecture can readily handle both hard and soft links.

V. Example Method for Building and Maintaining a GUFI

Figure 3:
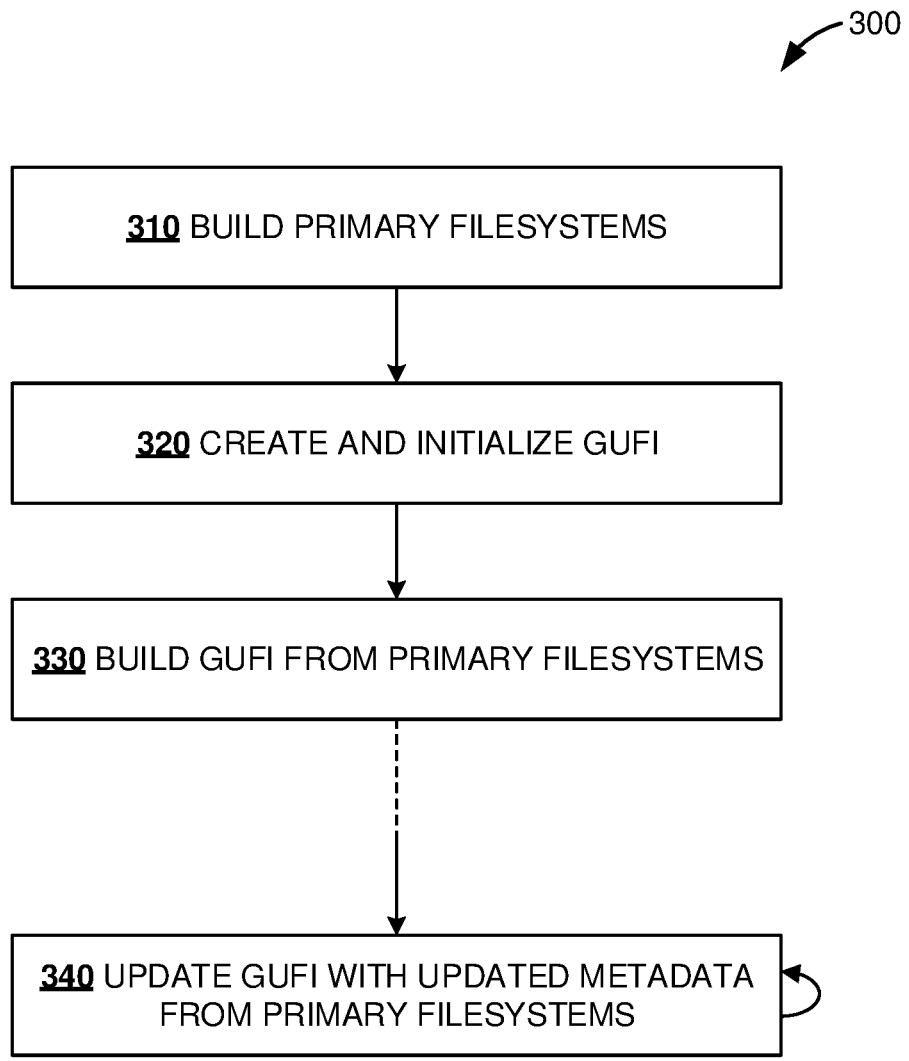
FIG. 3 is a flowchart outlining an example method for building and maintaining file indexing according to disclosed technologies.

FIG. 3 is a flowchart 300 outlining an example method for building and maintaining file indexing according to disclosed technologies. A GUFI-enabled filesystem can provide efficient indexing of metadata from one or more primary filesystems. At process block 310, primary filesystems can be built. As described herein, these primary filesystems can be of varying types, sizes, or tiers. The primary filesystems can be homogeneous or heterogeneous. In this environment, a GUFI can be created and initialized at process block 320. A bare GUFI can comprise of a root node such as GUFI root 104 and an empty attribute farm 108. In examples, the GUFI replicates metadata present in the primary filesystem, and accordingly can be loaded from one or more primary filesystems at process block 330.

In some examples, loading a primary filesystem into a GUFI can be a one-to-one copying of metadata or attribute information from entries in primary filesystem directories to data stores of corresponding GUFI tree nodes. In other examples, loading can include transformation of primary filesystem metadata into the hierarchical GUFI organization. For example, a flat primary filesystem could require resolution of a full path specification to determine which GUFI tree node a particular filesystem entry belongs to. In another example, entries from a flat primary filesystem may need to have access permissions checked for consistency with permissions previously assigned in the GUFI tree. Loading a GUFI can also include post-processing of the GUFI tree after all primary filesystem entries have been processed. Such post-processing can be used to build summary database tables D-SDB, to sort entries with an entries database EDB, or to perform tree operations on the GUFI tree. Tree operations can include sorting child nodes or balancing branches of the GUFI tree, including by splitting or joining child nodes. Post-processing tree operations can be performed top-down, bottom-up, breadth-first, depth-first, sequentially, or in parallel. In some examples, top-down, breadth-first, parallel processing can be preferred, while in other examples a combination of top-down and bottom-up post-processing operations can be performed. Bottom-up or depth-first processing can also be used to collect directory summary data D-SDB of individual directories into tree summary data T-SDB, or to unlink directories (because directory unlinks can require removal of all directory entries before the directory can be unlinked).

The GUFI architecture can be applied to a wide range of primary filesystems and storage tiers, and can be suitable for any hierarchical filesystem having metadata. In varying examples, a GUFI can support one or more of an archival filesystem, a campaign filesystem, a disk filesystem, a flash filesystem, a flat filesystem, a POSIX-compliant filesystem, a parallel filesystem, a scratch filesystem, or a tape filesystem, in any combination. GUFI can be implemented with or without explicit cross-node parallelism independently of the parallelism of the associated primary filesystems. Particularly, single node GUFI implementations can support parallel filesystems, and cross-node parallelized GUFI implementations can support non-parallel filesystems. The GUFI architecture is not limited to hierarchical primary filesystems, but can be applied to any system having logical units of metadata organized in a graph such as a directed acyclic graph (DAG). The broad applicability of GUFI ensures long-term viability of the GUFI architecture even as storage architectures and preferred tierings evolve.

VI. Example Method for Loading a GUFI

Figure 4:
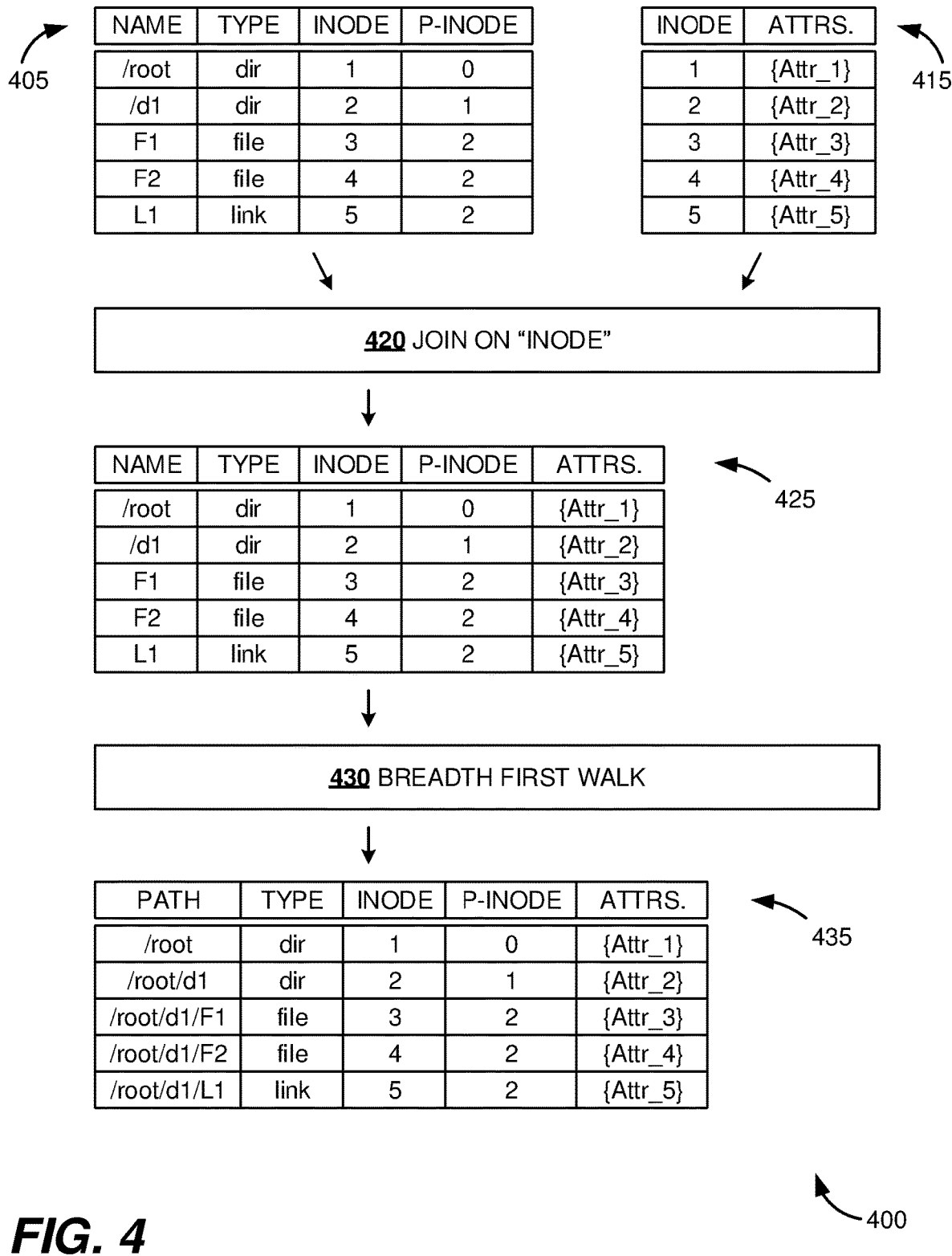
FIG. 4 depicts an example of loading a file index according to disclosed technologies.

FIG. 4 depicts an example 400 of loading a file index according to disclosed technologies. This example shows how a flat primary filesystem maintained as a database can be processed for loading into a hierarchical GUFI structure. The primary filesystem comprises two relational database tables 405, 415. Table 405 maintains the logical relationship between filesystem entries (files, links, directories) and their parent directories. Table 415 maintains attributes of all the filesystem entries. The inode value of each entry can be a common key shared by tables 405, 415. High Performance Storage Systems (HPSS) and Robinhood are examples of filesystem technologies that can maintain metadata in such a manner.

The records of table 405 include four fields: Name, Type, Inode, and P-Inode (short for Parent Inode). Five records are shown. The first record is for the filesystem root (name "/root"), which is of type directory ("dir"), and has inode value 1. Because the root has no parent, its p-inode value is set to 0. The root directory/root can include subdirectory d1 (name "/d1") which is also a directory, has inode value 2, and has a p-inode value 1 because its parent is the root directory whose inode value is 1. The next two records are for files F1, F2 which are files (type "file") having inode values 3, 4 respectively, and p-inode value of 2 (i.e. directory /d1). Finally, the last record is for a link (type "link") named L1, which has inode value 5 and is also in directory /d1, thus having p-inode value of 2.

The records of table 415 are illustrated having two fields: Inode and Attrs. (short for Attributes). Each record stores the set of attributes (e.g. {Attr_3}) for an entry keyed by its inode value (e.g. 3 for file F1). In some examples, the attributes can be stored in multiple named fields, such as size, type, creation timestamp, xattr, and so forth. In other examples, the attributes can be stored as key-value pairs, or in data structures, or as links to data structures.

At process block 420, the tables 405, 415 can be joined on their inode values, resulting in composite table 425. For each inode value 1-5, table 425 contains all the field values from table 405 and all the field values from table 415. At process block 430, a breadth-first walk can be performed to collect fully qualified pathnames for every filesystem entry in table 425. The breadth-first walk can be performed on table 425 by a recursive set of queries that simulate a breadth-first search. That is, starting with the root node /root, the path for the root node can be left intact, namely /root. Then, all entries having p-inode value of 1 can be collected and their fully qualified paths filled in. In the illustrated example, the root directory has a single entry /d1 whose fully qualified path can be set to /root/d1, however in other examples the root directory can have zero, one, or multiple each of subdirectories, files, or links, in any combination.

In a breadth-first example, all nodes at a particular depth of a filesystem hierarchy can be processed before proceeding to the next level of the hierarchy. Thus, if the root node contained two subdirectories d1 and d2, in turn having subdirectories {d11, d12} and {d21, d22} respectively, the order of processing can be d1, d2, d11, d12, d21, d22. The breadth-first tree walk affords some opportunity for parallelization and can be preferred in some examples, but this is not a requirement. In other examples, depth-first walk can be used, or a hybrid of breadth-first and depth-first, or a walk organized by entry type. In the latter example, all directories can be walked first, to determine the filesystem hierarchy and populate a GUFI tree, followed by walking all file and link entries to populate the data stores associated with respective GUFI tree nodes. Particularly, while the output of process block 430 is shown as a table 435, this is not a requirement. In some examples, table 435 can be used as an intermediate result from which a GUFI tree and attribute farm can be populated, while in other examples, table 435 can be omitted and the GUFI tree and attribute farm can be populated directly by walking the filesystem (represented as joined table 425) at process block 430.

In examples where table 435 is used to load the GUFI, a second breadth-first walk can be performed on table 435, proceeding level-by-level through the GUFI tree hierarchy and, at each level, loading the GUFI for all directories at that level. In examples where table 435 has been built in a breadth-first traversal order, the second breadth-first walk can be performed by reading entries in a simple linear traversal of table 435, and loading corresponding GUFI tree nodes in a breadth-first tree traversal. For a given directory at a given level, loading can (i) include writing an entries database table EDB for all entries of the given directory, from the corresponding entries of table 435, (ii) evaluating the entries' metadata to determine values of fields in the directory summary database table D-SDB, and populating the D-SDB accordingly, and (iii) adding child nodes to the GUFI tree for subdirectories of the given node. The second breadth-first walk can also be parallelized.

The directory entries of a flat primary filesystem, such as shown in tables 405, 415, can be in an order different from the order of a breadth-first traversal. In such examples, the records can be suitably sorted at any stage while transforming from native primary filesystem tables 405, 415 into the table 435 which used to efficiently load the GUFI. In the example above, sorting is performed by a series of recursive queries on table 425, as described at process block 430, however this is not a requirement. In further examples, an explicit sort can be performed on table 425, following which the breadth-first walk of process block 430 can be reduced to a simple linear traversal, or tables 405, 415 can be sorted prior to joining at process block 420, or the sorting can be integrated into the join procedure of process block 420.

VII. Additional Loading Examples

Loading from a POSIX Filesystem

Figure 5:
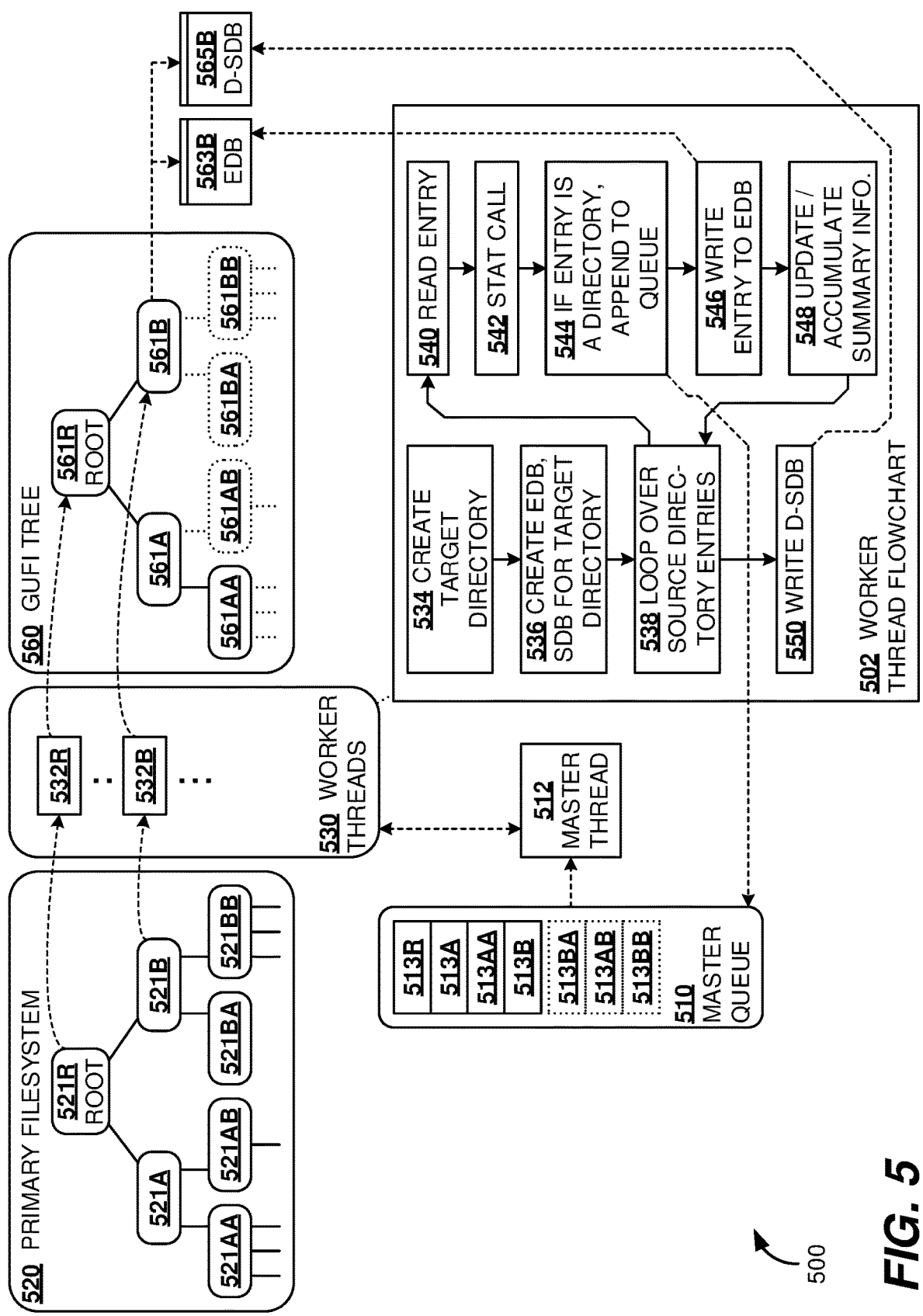
FIG. 5 depicts an example of loading a GUFI from a hierarchical file system according to disclosed technologies.

Loading a GUFI from a POSIX file system can be accomplished by doing a breadth-first walk of the primary filesystem tree and using a new thread for each directory encountered. FIG. 5 is an illustration of loading a GUFI from a hierarchical file system according to disclosed technologies. Worker threads 530 can operate on respective directories of the primary file system 520 to build corresponding nodes of GUFI tree 560 and associated data structures. The GUFI tree 560 has a structure mirroring the structure of the primary filesystem. However, where directories of the primary filesystem contain entries for files, links, etc., the nodes (directories) of the GUFI tree link to respective databases.

As shown, primary file system 520 has a root directory 521R with sub-directories 521A, 521B, and in turn sub-directories 521AA, 521AB, 521BA, 521BB as shown. The three lines descending from directory 521AA indicate further levels of the directory tree of the primary filesystem 520. Correspondingly, the GUFI tree 560 is being built with a root node 561R with child nodes 561A, 561B, and in turn grandchild nodes 561AA, 561AB, 561BA, 561BB. The illustration of GUFI tree 560 is a snapshot; certain portions are shown dotted to indicate that they have not yet been constructed. The suffixes (e.g. "B" or "AA") are matched between directories of primary file system 520 and corresponding nodes of the GUFI tree 560. Any of the directories 521x of primary file system 520 can include other entries besides subdirectories, for example entries for data files or links. All entries of a directory, e.g. 521B, can be used to populate one or more data structures, e.g. 563B, 565B, associated with the corresponding GUFI node 561B.

Two worker threads 532R, 532B are shown, operating on directories 521R, 521B to build corresponding GUFI tree nodes 561R, 561B respectively and their associated data structures. For clarity of illustration, other worker threads are not shown. Dashed lines are used in FIG. 5 to indicate interactions between depicted entities. For example, worker thread 532B takes input from directory 521B and builds as output GUFI node 561B, which is coupled with its entries database (EDB) 563B and summary database (SDB) 565B. For clarity of illustration, other data structures described herein are not shown in FIG. 5.

The worker threads 530 can be launched by a master thread 512 which controls the loading process. The master thread 512 can read entries in master queue 510 and launch corresponding worker threads 530. Initially an entry 513R, corresponding to root directory 521R of the primary filesystem 520, can be placed on queue 510. The master thread 512 can iterate through entries 513x placed on the queue 510 for respective directories 521x, assigning the directories 521x to worker threads 532x, and launching the worker threads 532x, one worker thread 532x per directory 521x. In the snapshot view of queue 510, four entries have been processed, 513R-513B, while three other entries 513BA-513BB are shown dotted to indicate that they have not yet been acted on by master thread 512.

The lower right of FIG. 5 contains a flowchart 502, with process block 534-548, for a representative worker thread 532x. The flowchart 502 is described for worker thread 532B. At process block 534, worker thread 532B can create a target directory 561B on the GUFI tree. At process block 536, the corresponding entries database (EDB) 563B and summary database (SDB) 565B can be created. Then, at process block 538, worker thread 532B can loop over entries (files, links, subdirectories) in source directory 521B. For each such entry, the worker thread can execute process blocks 540-548. At process block 540, the entry can be read, followed by a stat call on the current directory entry, to retrieve information (e.g. entry type, file size, modification time, extended attributes) associated with this directory entry. At process block 544, if the entry is a directory, a corresponding queue entry can be appended to master queue 510. For example, the entry within directory 521B for sub-directory 521BA can cause queue entry 513BA to be added to the queue 510, and similarly for queue entry 513BB subsequently. In this way, parallelized recursive traversal of the primary filesystem 520 can be performed. At process block 546, the worker thread 532B can populate entries table EDB 563B with stat or other attributes for the current entry. Summary information can be updated or accumulated in temporary storage at process block 548. After the loop 538 has been completed, i.e. all directory entries in directory 521B have been traversed, the flowchart 502 continues to process block 550, where any final calculations for summary information can be performed and the summary information can be stored in the directory summary table D-SDB 565B for the current GUFI directory 561B, and completing the execution of flowchart 502.

Master thread 512 can process queue entries in master queue 510 as queue entries are added to the queue, and subject to available computing resources. Because of parallelization, addition of queue entries 513x to queue 510 can be interleaved among active worker threads 530. This can depend on details of thread scheduling, and on the relative incidence of non-directory entries within a directory 521x of the primary filesystem 520. In the illustration of FIG. 5, entries for the pairs 513A/513B, 513AA/513AB, and 513BA/513BB are in the order expected, and sub-directory queue entries such as 513BA come after parent queue entries such as 513B. However, due to parallelization the queue entry 513AA can occur between queue entries 513A, 513B. Similarly, queue entry 513BA can precede entry 513AB.

The described procedure can be an easily parallelizable way to extract metadata information from a primary filesystem and create the GUFI tree index and attribute farm. Because only one thread 532x works on any given GUFI directory 561x, locks on the summary or entries tables 565B, 563B are not required.

Because stat calls can be relatively slow, loading the GUFI can be at least 10, at least 20, or at least 100 times faster than extracting the metadata from a primary POSIX filesystem.

Loading from a Flat Filesystem or a Flat Dump of a Filesystem

In some examples, a GUFI can also be loaded from a flat file dump of a primary filesystem. Commonly, records from a single directory can be grouped together in the flat file (or, flat file dump). Otherwise, the flat file can be sorted so that all the entries for a directory fall immediately below the parent directory entry. Then, a queue based approach can be used, similar to the loading from a POSIX primary filesystem described above. With a sorted flat file, a master task can read the source input file looking for offsets and lengths of stanzas in the sorted records to identify each parent directory and its direct children records (i.e. entries in the parent directory). These directories can be placed on a queue, from which directories can be assigned successively to worker threads to create the entries table EDB and directory summary table D-SDB for the assigned directories.

Further Aspects of GUFI Loading

Many alternative techniques for loading a GUFI can be implemented. In some examples, GUFI loading and updates can make use of existing snapshot operations, whereby a GUFI can be loaded or updated from a filesystem snapshot, so that consistency of the GUFI is guaranteed by the consistency of the snapshot, and the GUFI loading imposes no additional burden on the primary filesystem. Appendices 1-4 provide further examples.

VIII. Example Databases

Databases such as entries database EDB, directory summary database D-SDB, or tree summary database T-SDB can be specified by schema which define the layout of records or fields of the respective tables. Tables 1-3 show exemplary schema for an EDB, D-SDB, and T-SDB respectively.

TABLE 1

Entries Database EDB - Example Schema

| Field name and data type | Description or Comment |
|---|---|
| CREATE TABLE Entries ( | Table with one record for each file or link within current directory |
| name TEXT PRIMARY KEY, | name of file (just name, not full path, for efficient renames) |
| type TEXT, | F for file, L for link |
| inode INT, | Inode |
| mode INT, | posix mode bits |
| nlink INT, | number of links |
| uid INT, | uid (user identifier) |
| gid INT, | gid (group identifier) |
| size INT, | Size |
| blksize INT, | Blocksize |
| blocks INT, | Blocks |
| atime INT, | access time |
| mtime INT, | file contents modification time |
| ctime INT, | metadata change time |
| linkname TEXT, | if type is link, this is path to link |
| xattrs TEXT | extended attributes: single text string with delimited key/value pairs |
| ); | |

TABLE 2

Directory Summary Database D-SDB - Example Schema

| Field name and data type | Description or Comment |
|---|---|
| CREATE TABLE Summary ( | summary information for this directory |
| name TEXT PRIMARY KEY, | name (not path, due to renames) |
| type TEXT, | D for directory |
| inode INT, | Inode |
| mode INT, | posix mode bits |
| nlink INT, | number of links |
| uid INT, | uid (user identifier) |
| gid INT, | gid (group identifier) |
| size INT, | Size |
| blksize INT, | Blocksize |
| blocks INT, | Blocks |
| atime INT, | access time |
| mtime INT, | directory contents modification time |
| ctime INT, | metadata change time |
| linkname TEXT, | if type is link, this is path to link |
| xattrs TEXT, | extended attributes: single text string with delimited key/value pairs |
| totfiles INT, | total files in this directory |
| totlinks INT, | total links in this directory |
| minuid INT, | minimum uid |

TABLE 2-continued

Directory Summary Database D-SDB - Example Schema

| Field name and data type | Description or Comment |
| --- | --- |
| maxuid INT, | maximum uid |
| mingid INT, | minimum gid |
| maxgid INT, | maximum gid |
| minsize INT, | minimum file size |
| maxsize INT, | maximum file size |
| totltk INT, | total number of files smaller than 1 kB |
| totmtk INT, | total number of files of size at least 1 kB |
| totltm INT, | total number of files smaller than 1 MB |
| totmtm INT, | total number of files of size at least 1 MB |
| totmtg INT, | total number of files of size at least 1 GB |
| totmtt INT, | total number of files of size at least 1 TB |
| totsize INT, | total bytes in files in this directory |
| minctime INT, | minimum ctime |
| maxctime INT, | maximum ctime |
| minmtime INT, | minimum mtime |
| maxmtime INT, | maximum mtime |
| minatime INT, | minimum atime |
| maxatime INT, | maximum atime |
| minblocks INT, | minimum blocks |
| maxblocks INT, | maximum blocks |
| totxattr INT, | number of files with extended attributes |
| depth INT | depth this directory is in the tree |
| ); | |

TABLE 3

Tree Summary Database T-SDB - Example Schema

| Field name and data type | Description or Comment |
| --- | --- |
| CREATE TABLE TreeSummary ( | summary information for tree rooted at this directory |
| totsubdirs INT, | total subdirectories in tree |
| maxsubdirfiles INT, | maximum files in a subdirectory |
| maxsubdirlinks INT, | maximum links in a subdirectory |
| maxsubdirsize INT, | most bytes in any subdirectory |
| totfiles INT, | total files in tree |
| totlinks INT, | total links in tree |
| minuid INT, | minimum uid |
| maxuid INT, | maximum uid |
| mingid INT, | minimum gid |
| maxgid INT, | maximum gid |
| minsize INT, | minimum file size |
| maxsize INT, | maximum file size |
| totltk INT, | total number of files smaller than 1 kB |
| totmtk INT, | total number of files of size at least 1 kB |
| totltm INT, | total number of files smaller than 1 MB |
| totmtm INT, | total number of files of size at least 1 MB |
| totmtg INT, | total number of files of size at least 1 GB |
| totmtt INT, | total number of files of size at least 1 TB |
| totsize INT, | total bytes in files in tree |
| minctime INT, | minimum ctime |
| maxctime INT, | maximum ctime |
| minmtime INT, | minimum mtime |
| maxmtime INT, | maximum mtime |
| minatime INT, | minimum atime |
| maxatime INT, | maximum atime |
| minblocks INT, | minimum blocks |
| maxblocks INT, | maximum blocks |
| totxattr INT, | number of files with xattrs |
| depth INT, | depth this tree summary is in the tree |
| ); | |

IX. Example Queries

The Example queries in Table 4 below follow a syntax (Dir Query _T Query _S Query_E Flags). Dir specifies a target directory (or, root of a subtree) on which the query can be run. Query_T is a query directed to a tree-summary T-SDB, if present, that serves as a filter. If, during tree traversal, a T-SDB is encountered at a given node for which Query_T returns a null result, then there are no matching subdirectories or entries in the subtree of the given node, and the subtree of the given node can be omitted from the query processing. Thus, Query_T acts as a subtree filter which enables considerable efficiencies in metadata query processing. Such queries can be supported by Filesystem in Userspace (FUSE) technology. A client can provide input queries as described, including up to three SQL type query statements. In examples, the SQL queries can include any metadata query conforming to implemented database schemas. Standard POSIX commands such as ls, cd, find can be recognized by the query processing program.

In like manner, Query_S is directed to a directory summary D-SDB and serves as a gate for a current directory. If, during tree traversal, Query_S returns a null result on the D-SDB of a current directory, then there are no matching entries (files, links, or subdirectories) in the current directory, and the entries table EDB of the current directory can be skipped. However, Query_S can be limited to entries of the current directory: subdirectories of the current directory can have entries of interest and can be traversed regardless of the Query_S result. That is, Query_S does not allow omission of an entire subtree, but saves on processing of entries of single directories.

Query_E is a desired query that can be run on the entries database table EDB of some or all traversed nodes. Because of Query_T filtering or user permissions, the traversed nodes can be less than all nodes of the subtree of directory Dir. Because of Query_S gating, Query_E can be skipped at certain traversed nodes.

Finally, flags perform various customizable functions, such as printing levels, number of threads, output formatting, or query logic. For example, any combination of Query_T, Query_S, Query_E can be specified as having a logical-AND relationship (returning a non-empty result if multiple queries are satisfied) or a logical-OR relationship (returning a non-empty result if at least one query is satisfied). A flag can also be used to distinguish between queries on a full subtree and queries on just target directory Dir.

Table 4 shows some example queries with comments. In the examples below, the % character is a wildcard, so that % history % can match e.g. "history", "abchistory", "historyxyz", or "abchistoryxyz".

TABLE 4

Example Queries

| No. | Part | Query Item |
| --- | --- | --- |
| 1 | Comment | # search for directories having history in directory name and also search for entries (e.g. files) having history in name |
|  | Dir | /Users/me/target_directory |
|  | Query_T | Null |
|  | Query_S | "select name,type,uid,gid,size from summary where name like '%history%'" |
|  | Query_E | "select name,type,uid,gid,size from entries where name like '%history%'" |
|  | Flags | 1 0 0 |
| 2 | Comment | # this is where a directory and entry both have history in them |
|  | Dir | /Users/me/target_directory |
|  | Query_T | Null |
|  | Query_S | "select name,type,uid,gid,size from summary where name like '%history%'" |

TABLE 4-continued

Example Queries

| No. | Part | Query Item |
|---|---|---|
| | Query_E | "select name,type,uid,gid,size from entries where name like '%history%'" |
| | Flags | 1 1 0 |
| 3 | Comment | # this is looks in all directories and entries that are big |
| | Dir | /Users/me/target_directory |
| | Query_T | Null |
| | Query_S | Null |
| | Query_E | "select name,type,uid,gid,size from entries where size >100000000" |
| | Flags | 0 0 0 |
| 4 | Comment | # this is looks in only directories where large files exist and finds entries that are big |
| | Dir | /Users/me/target directory |
| | Query_T | Null |
| | Query_S | "select name,type,uid,gid,size from summary where maxsize > 90000000" |
| | Query_E | "select name,type,uid,gid,size from entries where size >100000000" |
| | Flags | 0 0 0 |
| 5 | Comment | # this is looks in only directories where large files exist and finds entries that are big and have history in the name |
| | Dir | /Users/me/target_directory |
| | Query_T | Null |
| | Query_S | "select name,type,uid,gid,size from summary where maxsize >90000000" |
| | Query_E | "select name,type,uid,gid,size from entries where size > 100000000 and name like '%history%'" |
| | Flags | 0 0 0 |
| 6 | Comment | # this example prunes tree traversal if treesummary shows no files > 90 MB, and also skips checking entries in directories having no files > 90 MB. |
| | Dir | /Users/me/temp |
| | Query_T | "select name,type,uid,gid,size from summary where maxsize >90000000" |
| | Query_S | "select name,type,uid,gid,size from summary where maxsize >90000000" |
| | Query_E | "select name,type,uid,gid,size from entries where size >100000000 and name like '%history%'" |
| | Flags | 0 0 0 |
| 7 | Comment | # this example uses directory summary only to count files 1 GB. # this example targets the root directory of a primary filesystem and could be run by an administrative client |
| | Dir | /scratch1/project_U |
| | Query_T | Null |
| | Query_S | "select totmtg from summary" |
| | Query_E | Null |
| | Flags | 0 0 0 |

A query according to Example 1 of Table 4 searches for files and directories having substring "history" in the filename. Query_S is used to identify directories having "history" in the filename, and Query_E identifies directories having "history" in the filename. The flags specify a logical-OR relation between Query_S and Query_E; Query_S is not used as a gate. A query according to Example 2 searches for files having substring "history" in their filenames, within directories also having "history" in their filenames. The flags specify a logical-AND relation between Query_S and Query_E; Query_S can be used as a gate. Queries according to examples 3 and 4 search for files larger than 100 MB; example 3 has no Query_S gate, while Example 4 is gated on directories having at least one file larger than 90 MB. The query of Example 5 is similar to Example 4, but looks for files larger than 100 MB that also have "history" in the filename. The query of Example 6 is similar to Example 5, but also uses Query_T to prune tree traversal. Finally, the query of Example 7 uses directory summaries to count files of size at least 1 GB, without recourse to the entries database EDB at all.

X. Example Performance Results

In some examples, the process of loading a GUFI from a primary filesystem has been found to be 10×, 20×, or 100× faster than a metadata search (e.g. using ReadDirPlus), establishing that offloading metadata operations can be a lightweight operation on the primary filesystem. Once the GUFI has been built, further metadata searches can be run on the GUFI with zero burden on the primary filesystem.

Query processing speeds above $10^5$ files per second have been demonstrated in a first test, on a laptop computer. In a second test, over 21 million files were distributed among 135,870 directories, with 20 of the directories having 1 million files each. A query scan using 20-40 threads executed in 67 seconds, demonstrating multi-threaded performance, and database performance not adversely impacted by very large directories. A third test was performed with 10 directories having 20 million files each, with a file index size (i.e. size of metadata database) for each directory about 1.6 GB. Metadata searches were performed looking for a partial string match in a filename. A single thread scan of a single directory took 13 s, for a rate of 1.6 million files/second. A ten thread scan on a single processor, one thread per directory, completed all the directories in 40 seconds, for a rate of 5.1 million files/second. These tests were performed without benefit of summary database tables, on a commercial laptop with a mid-range solid state flash storage drive (SSD).

By way of comparison, a tuned Lustre metadata server can achieve 40,000-120,000 stat calls per second, in varying scenarios. A recent single-server query on a GUFI tree with 750 million files achieved the equivalent of 7.5 million stat calls per second with no special optimizations, no tuning, not using tree summary or directory summary databases, nor any database indexing. This performance level is well beyond the capabilities of a conventional metadata server. With tuning and hardware better matched to GUFI needs, another 3× performance improvement could be achieved. Incorporating tree summaries to prune tree traversal and other efficiency enhancements as described herein could boost performance to about 10× in many practical scenarios. The single-server comparison can be considered representative, because both conventional and GUFI embodiments can be expected to scale similarly when distributed over multiple parallel metadata servers.

XI. Example Large-Scale Computing Environment

Figure 6:
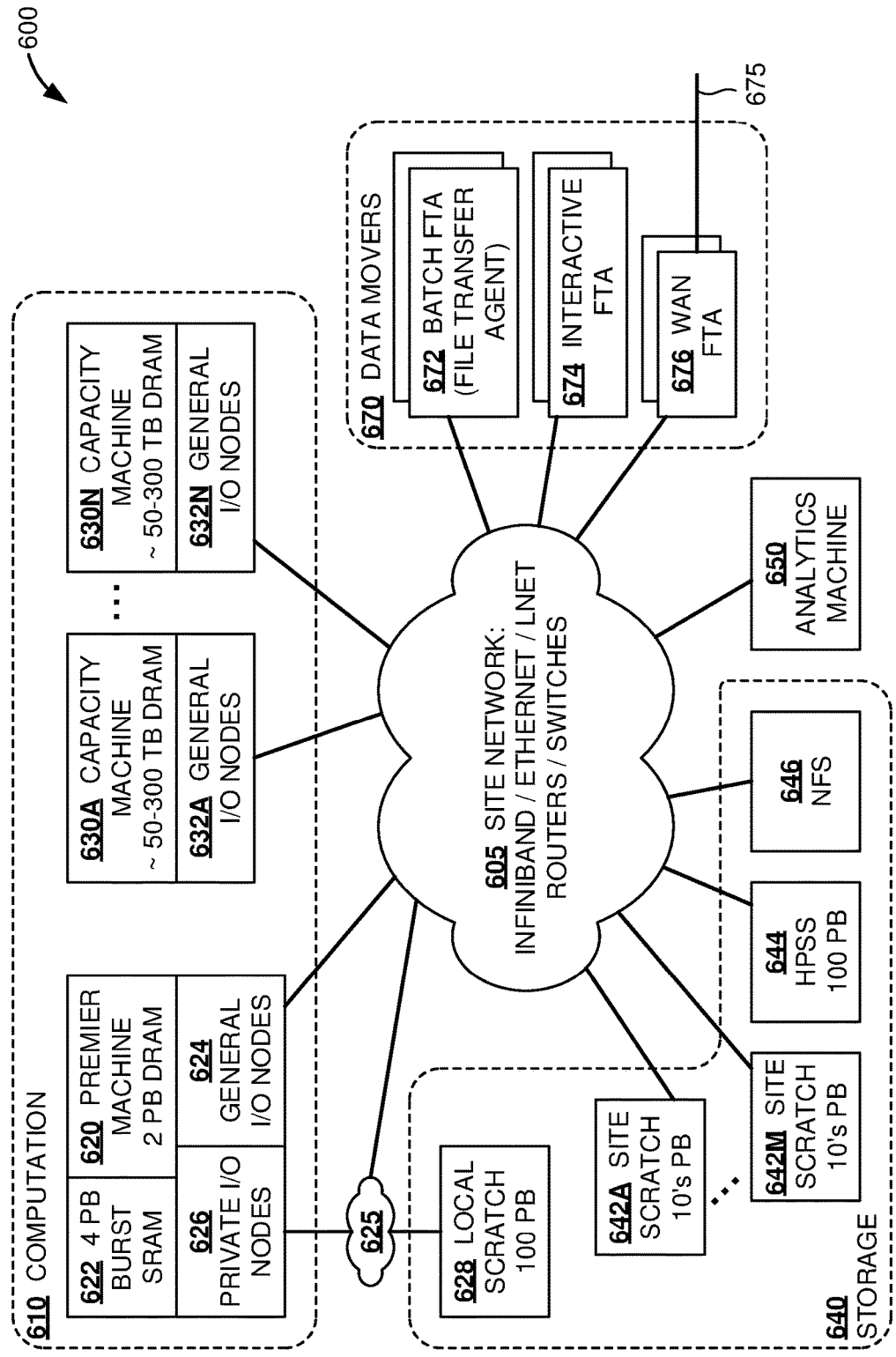
FIG. 6 depicts an example of a large-scale computing environment in which the disclosed technologies can be deployed.

FIG. 6 illustrates a large-scale computing environment 600 in which the disclosed technologies can be deployed. At a high-level, the computing environment 600 includes computational resources 610, storage resources 640, data movers 670, computer networks 605, 625, 675, as well as analytics 650.

As illustrated, computation resources 610 include a premier machine 620 having 20,000 multi-processor nodes totaling a few million cores, 2 PB of DRAM, a 4 PB NAND SRAM burst buffer 622 (4 Tb/s bandwidth), and specialized I/O nodes 624, 626. General I/O nodes 624 provide network connectivity throughout the computing environment 600 via site networking 605, while private I/O nodes 626 can be coupled via a network connection 625 (e.g., a private InfiniB and connection) to local scratch disk storage 628 of about 100 PB with 1 TB/s throughput. Site networking 605 can use a damselfly topology. Additional compute capacity can be provided by capacity machines 630A-630N, each with 50-300 TB of DRAM and dedicated I/O nodes 632A-632N.

Storage resources 640 include sitewide scratch storage 642A-642M totaling around 100 PB of PMR (perpendicular magnetic recording) drives, with about 1 TB/s throughput. A sitewide NFS (network file system) disk campaign store 646 can provide growing longer term storage using SMR (shingled magnetic recording) drives, roughly 30 PB capacity, with about 1 GB/s throughput for each PB of storage. High performance storage system (HPSS) 644 can provide 100 PB of archival parallel tape storage with disk cache and 10 GB/s throughput.

File transfers can be handled by a range of data movers 670, including about 100 batch FTAs (file transfer agents), with additional interactive FTAs 674 for console operations, and WAN (wide area network) FTAs 676 for remote transfers over WAN connection 675. The WAN FTAs 676 support perimeter security, and the WAN connection 675 can provide hundreds of Gbps bandwidth. The batch FTAs can each provide 2-8 GB/s throughput.

Analytics machine 650 supports Hadoop Distributed File System (HDFS) for big-data analytics capabilities on coupled storage, with an HDFS-POSIX shim for access to POSIX resources within the computing environment 600.

A GUFI can provide a unifying index over all the disparate, large file systems in such an environment.

XII. Additional Examples

According to one aspect, the disclosed technologies can be implemented as a method of indexing metadata in a filesystem. A GUFI, as described herein, is built from at least one primary filesystem. The GUFI is updated with updated metadata from the primary filesystem(s). In some examples, the GUFI includes a tree having multiple nodes and replicating a directory structure of one or more of the primary filesystem(s). Nodes of the tree represent respective directories of the primary filesystem(s). The GUFI can also include one or more database tables for at least one of the nodes, the database tables storing file attribute information. The database tables can include a first entries table having a plurality of records for respective entries (e.g. files or links) in the corresponding directory, the records storing metadata attributes of the respective entries. The database tables can include a summary table storing summary attributes over respective files (or other entries) in the corresponding directory. The database tables can include a tree-summary table storing summary attributes aggregated over directories or files of a subtree headed by the corresponding directory. The database tables can include one or more of a relational database table, an SQL or SQLite table, or an embedded database. In additional examples, the updating can include pushing the updated metadata to the GUFI in response to an event at a primary filesystem. The updating can include retrieving the updated metadata from a primary filesystem responsive to a schedule or responsive to a command. The command can be received from a client such as an administrator, an administrative application or service, a user, or a user application. The primary filesystems can include one or more of an archival filesystem, a campaign filesystem, a disk filesystem, a flash filesystem, a flat filesystem, a POSIX-compliant filesystem, a parallel filesystem, a scratch filesystem, or a tape filesystem, in any combination.

In another aspect, the disclosed technologies can be implemented as a method or processing filesystem metadata queries. A query is received targeted to a filesystem directory. A first node is identified in a tree having multiple nodes with associated database tables, the first node corresponding to the filesystem directory. Nodes of a subtree of the first node are traversed, each traversed node corresponding to a subdirectory of the filesystem directory. A database table is queried at one or more of the traversed nodes to obtain results. A response to the received query is provided, based on at least a portion of the results collected over the traversed nodes. In some examples, the received query can be associated with a first user, and the traversal can be restricted to nodes of the first node's subtree for which the user has a first permission such as an execute permission. The database tables can include one or more of an entries table, a summary table, or a tree-summary table similar to those described herein. In additional examples, a component of the received query can be applied to a tree-summary table at a given node to obtain a first result. Responsive to the first result, further query on the subtree of the given node can be omitted. A component of the received query can be applied to a summary table at a given node to obtain a second result. Responsive to the second result, further query on database tables of the given node can be omitted.

In a further aspect, the disclosed technologies can be implemented as a system incorporating one or more processors with coupled memory, and computer-readable media storing computer-readable instructions which, when executed by the processors, cause the processors to perform a method including one or more of the following actions. The actions can include implementing a GUFI having a tree with multiple nodes representing respective directories of primary filesystems and, for at least one of the nodes, a database table storing file attribute information. The actions can include loading the GUFI from the primary filesystems, or updating the GUFI from one or more of the primary filesystems. The actions can include processing filesystem metadata queries using the GUFI. In some examples, the instructions can include instructions for implementing the primary filesystems.

In some examples, two or more nodes of the multiple nodes can have distinct database tables. In some examples, any two nodes of the multiple nodes can have distinct database tables.

XIII. Example Computing Environment

Figure 7:
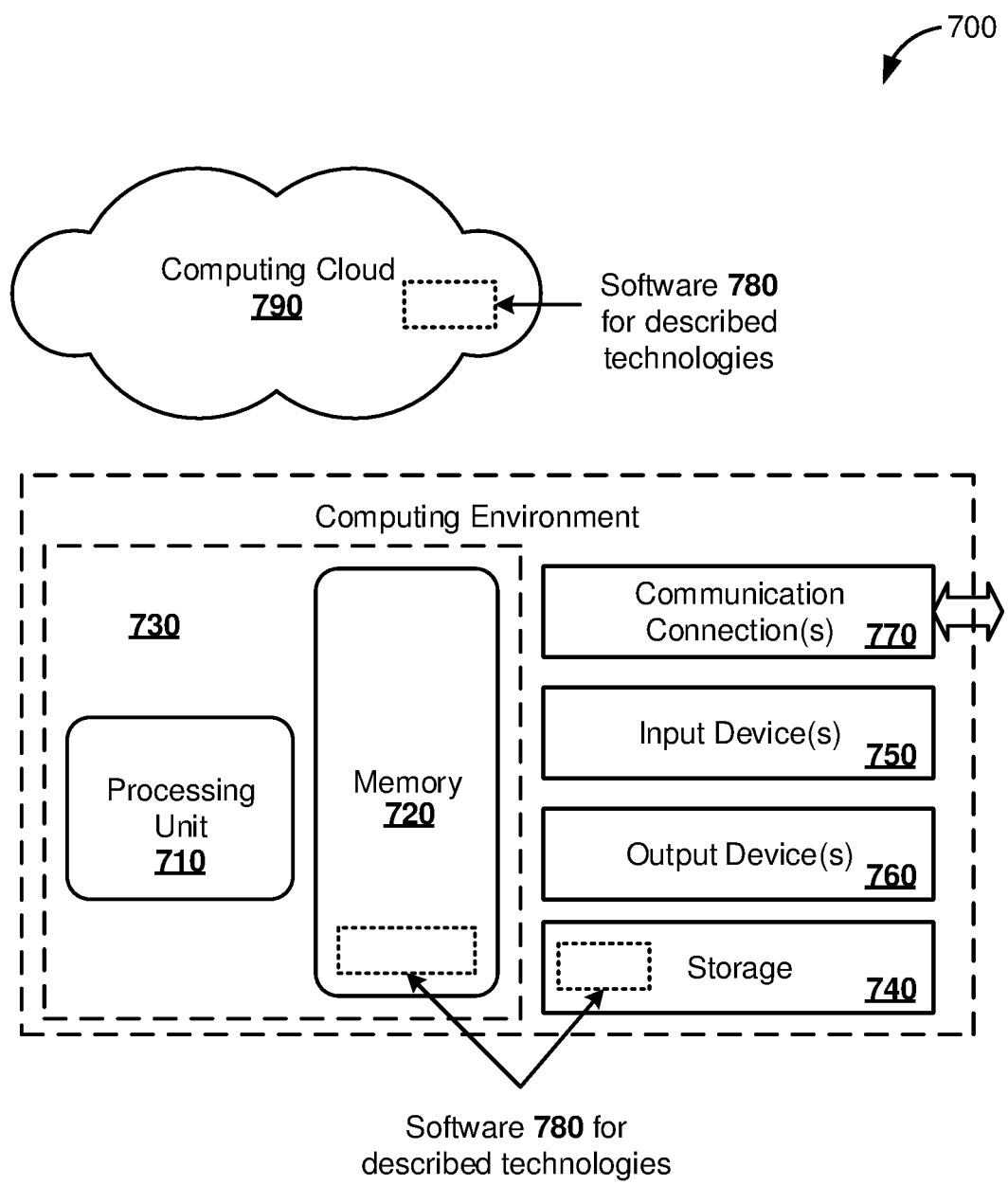
FIG. 7 illustrates a generalized example of a suitable computing environment in which described embodiments, techniques, and technologies pertaining to a disclosed file index can be implemented.

FIG. 7 illustrates a generalized example of a suitable computing environment 700 in which described examples, techniques, and technologies, including enumeration of objects in a file system or a directory structure, can be implemented. For example, the computing environment 700 can implement all of the functions described with respect to FIGS. 1-6, as described herein. Particularly, the computing environment can implement a unified hybrid file index.

The computing environment 700 is not intended to suggest any limitation as to scope of use or functionality of the technology, as the technology can be implemented in diverse general-purpose or special-purpose computing environments. For example, the disclosed technology can be implemented with other computer system configurations, including hand held devices, multiprocessor systems, microprocessor-based or programmable consumer electronics, network PCs, minicomputers, mainframe computers, and the like. The disclosed technology can also be practiced in distributed computing environments where tasks can be performed by remote processing devices that can be linked through a communications network. In a distributed computing environment, program modules can be located in both local and remote memory storage devices.

With reference to FIG. 7, the computing environment 700 includes at least one central processing unit 710 and memory 720. In FIG. 7, this most basic configuration 730 is included within a dashed line. The central processing unit 710 executes computer-executable instructions and can be a real or a virtual processor. In a multi-processing system, multiple processing units execute computer-executable instructions to increase processing power and, as such, multiple processors can be running simultaneously. The memory 720 can be volatile memory (e.g., registers, cache, RAM), non-volatile memory (e.g., ROM, EEPROM, flash memory, etc.), or some combination of the two. The memory 720 stores software 780, images, and video that can, for example, implement the technologies described herein. A computing environment can have additional features. For example, the computing environment 700 includes storage 740, one or more input devices 750, one or more output devices 760, and one or more communication connections 770. An interconnection mechanism (not shown) such as a bus, a controller, or a network, interconnects the components of the computing environment 700. Typically, operating system software (not shown) provides an operating environment for other software executing in the computing environment 700, and coordinates activities of the components of the computing environment 700. The terms computing environment, computing node, computing system, and computer are used interchangeably.

The storage 740 can be removable or non-removable, and includes magnetic disks, magnetic tapes or cassettes, CD-ROMs, CD-RWs, DVDs, or any other medium which can be used to store information and that can be accessed within the computing environment 700. The storage 740 stores instructions for the software 780 and measurement data, which can implement technologies described herein.

The input device(s) 750 can be a touch input device, such as a keyboard, keypad, mouse, touch screen display, pen, or trackball, a voice input device, a scanning device, or another device, that provides input to the computing environment 700. The input device(s) 750 can also include interface hardware for connecting the computing environment to control and receive data from host and client computers, storage systems, or administrative consoles.

For audio, the input device(s) 750 can be a sound card or similar device that accepts audio input in analog or digital form, or a CD-ROM reader that provides audio samples to the computing environment 700. The output device(s) 760 can be a display, printer, speaker, CD-writer, or another device that provides output from the computing environment 700.

The communication connection(s) 770 enable communication over a communication medium (e.g., a connecting network) to another computing entity. The communication medium conveys information such as computer-executable instructions, compressed graphics information, video, or other data in a modulated data signal.

Some examples of the disclosed methods can be performed using computer-executable instructions implementing all or a portion of the disclosed technology in a computing cloud 790. For example, a primary filesystem can be in the computing cloud 790, while a disclosed file index can be operated in the computing environment.

Computer-readable media are any available media that can be accessed within a computing environment 700. By way of example, and not limitation, with the computing environment 700, computer-readable media include memory 720 and/or storage 740. As should be readily understood, the term computer-readable storage media includes the media for data storage such as memory 720 and storage 740, and not transmission media such as modulated data signals.

XIV. General Considerations

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the terms "or" or "and/or" mean any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "apply," "estimate," "analyze," "identify," "instruct," "traverse," "build," "load," "walk," and "determine" to describe the disclosed methods. These terms are high-level abstractions of the actual operations that are performed. The actual operations that correspond to these terms can vary depending on the particular implementation and can be readily discerned by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented using computer-executable instructions stored on one or more computer-readable media (e.g., non-transitory computer-readable media, such as one or more optical media discs, volatile memory components (such as DRAM or SRAM), or nonvolatile memory components (such as flash drives or hard drives)) and executed on a computer (e.g., any commercially available computer, proprietary computer, purpose-built computer, or supercomputer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Clojure, Common Lisp, Dylan, Erlang, Fortran, Go, Haskell, Java, *Julia*, Python, R, Scala, Scheme, SQL, XML, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Having described and illustrated the principles of our innovations in the detailed description and accompanying drawings, it will be recognized that the various examples can be modified in arrangement and detail without departing from such principles. In view of the many possible examples to which the principles of the disclosed technology can be applied, it should be recognized that the illustrated examples are only preferred examples and should not be taken as limiting the scope of the disclosed technology. Rather, the scope of the claimed subject matter is defined by the following claims. We therefore claim as our invention all that comes within the scope of these claims.

What is claimed is:

1. A method of indexing metadata in a filesystem, the method comprising:
   by a computer:
   building a Grand Unified File Index (GUFI) from at least one primary filesystem;
   wherein for a given filesystem of the at least one primary filesystem, the given filesystem comprising a plurality of directories, the building comprises a parallelized breadth-first traversal of the directories by respective threads or processes, each thread or process loading metadata of entries of the corresponding directory into one or more database tables linked to a node of the GUFI associated with the corresponding directory; and
   updating the GUFI with updated metadata from the at least one primary filesystem.

2. The method of claim 1, wherein the GUFI comprises a tree having a plurality of the nodes associated with the directories and replicating respective directory structure(s) of the primary filesystem(s).

3. The method of claim 2, wherein the database tables comprise:
   an entries table comprising a plurality of records for respective files in the corresponding directory, the records comprising metadata attributes of the respective files.

4. The method of claim 2, wherein the database tables comprise:
   a summary table comprising summary attributes for respective files in the corresponding directory.

5. The method of claim 1, wherein the updating comprises:
   pushing the updated metadata to the GUFI, responsive to an event at one of the primary filesystems.

6. The method of claim 1, wherein at least one of the database tables is a relational database table.

7. The method of claim 1, wherein the database tables linked to the node associated with a given directory of the plurality of directories comprise:
   an entries database comprising a plurality of records for respective files in the given directory, the records comprising the metadata of the respective files;
   a directory summary database comprising one or more attribute summaries over all entries of the given directory; and
   a tree summary database comprising one or more attribute summaries aggregated recursively over a subtree of the given directory and all subdirectories of the given directory.

8. The method of claim 7, wherein at least one of the attributes summaries of the directory summary database or the tree summary database is stored as a histogram.

9. The method of claim 1, wherein the updating comprises:
   retrieving the updated metadata from one or more of the primary filesystems, responsive to a schedule.

10. A method of processing filesystem metadata queries, comprising:
    receiving a query targeted to a filesystem directory;
    identifying a first node, in a tree comprising a plurality of nodes, at least one of the nodes having an associated database table, the first node corresponding to the filesystem directory;
    traversing the plurality of nodes in a subtree of the tree rooted at the first node, each of the traversed nodes corresponding to a subdirectory of the filesystem directory, wherein a given node of the traversed nodes is associated with at least two database tables, which comprise:
    an entries table, comprising a plurality of records for respective files in the corresponding subdirectory of the given node, the records comprising metadata attributes of the respective files, and
    a tree-summary table comprising summary attributes over the files or directories of a subtree headed by the corresponding subdirectory of the given node;
    querying the tree-summary table of the given node to obtain results;
    providing a response to the received query, the response being based on at least a portion of the results collected over the traversed nodes;
    applying a component of the query to the tree-summary table to obtain a first result; and responsive to the first result, skipping further application of the query on a daughter subtree of the tree rooted at the given node.

11. The method of claim 10, wherein the traversing is parallelized among a plurality of threads.

12. The method of claim 10, wherein the received query is associated with a first user, and the traversing is restricted to nodes of the subtree for which the first user has a first permission.

13. The method of claim 10, wherein the tree is a GUFI tree.

14. One or more computer-readable storage media storing computer-executable instructions that, when executed by a computer, cause the computer to process filesystem metadata queries, the computer-executable instructions comprising:
instructions that cause the computer to receive a query targeted to a filesystem directory;
instructions that cause the computer to identify a first node in a tree comprising a plurality of nodes, at least one of the nodes having an associated database table, the first node corresponding to the filesystem directory;
instructions that cause the computer to traverse the plurality of nodes in a subtree of the tree rooted at the first node, each of the traversed nodes corresponding to a subdirectory of the filesystem directory, wherein a given node of the traversed nodes is associated with at least two database tables, which comprise:
an entries table, comprising a plurality of records for respective files in the corresponding subdirectory of the given node, the records comprising metadata attributes of the respective files, and
a tree-summary table comprising summary attributes over the files or directories of a subtree headed by the corresponding subdirectory of the given node;
instructions that cause the computer to query the tree-summary table of the given node to obtain results;
instructions that cause the computer to provide a response to the received query, the response being based on at least a portion of the results collected over the traversed nodes;
instructions that cause the computer to apply a component of the query to the tree-summary table to obtain a first result; and
instructions that cause the computer to skip further application of the query on a daughter subtree of the tree rooted at the given node, responsive to the first result.

15. A system comprising:
at least one processor with memory coupled thereto; and
the computer-readable storage media of claim 14, coupled to the at least one processor;
wherein the at least one processor is configured to execute the computer-executable instructions stored on the computer-readable storage media.

16. One or more computer-readable storage media storing a Grand Unified File Index (GUFI) for a plurality of primary filesystems, each primary filesystem comprising a plurality of directories, wherein the GUFI is constructed by parallelized breadth-first traversal, by respective threads or processes, of the directories of each of the primary filesystems, each thread or process loading metadata of entries of the corresponding directory into one or more database tables linked to a node of the GUFI associated with the corresponding directory.

17. A system comprising:
one or more processors with memory coupled thereto;
the computer-readable storage media of claim 16, wherein:
the GUFI comprises:
a tree comprising a plurality of the nodes associated with the directories of the primary filesystems, and
for at least a given one of the nodes, the one or more database tables linked to the given node; and
one or more computer readable storage media storing instructions executable by at least one of the processors, the instructions comprising:
first instructions that, when executed, cause the system to load the GUFI from one or more of the primary filesystems;
second instructions that, when executed, cause the system to update the GUFI from one or more of the primary filesystems; and
third instructions that, when executed, cause the system to process filesystem metadata queries using the GUFI.

18. The system of claim 17, further comprising at least one flash storage device on which the first or second database table is stored.

19. The system of claim 17, wherein the filesystem metadata queries are processed using an embedded database library.

20. The system of claim 17, wherein the plurality of nodes comprises at least a first node and a second node, and a first database table storing file attribute information for the first node is distinct from a second database table storing file attribute information for the second node.

* * * * *